(12) United States Patent
Uematsu et al.

(10) Patent No.: US 12,280,813 B2
(45) Date of Patent: Apr. 22, 2025

(54) TRAIN OPERATION SUPPORT SYSTEM AND TRAIN OPERATION SUPPORT METHOD

(71) Applicant: Hitachi, Ltd., Tokyo (JP)

(72) Inventors: Ryota Uematsu, Tokyo (JP); Tsuyoshi Minakawa, Tokyo (JP); Yuki Maekawa, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 226 days.

(21) Appl. No.: 18/022,626

(22) PCT Filed: Sep. 7, 2021

(86) PCT No.: PCT/JP2021/032911
§ 371 (c)(1),
(2) Date: Feb. 22, 2023

(87) PCT Pub. No.: WO2022/130705
PCT Pub. Date: Jun. 23, 2022

(65) Prior Publication Data
US 2023/0311965 A1    Oct. 5, 2023

(30) Foreign Application Priority Data

Dec. 17, 2020    (JP) .................................. 2020-209109

(51) Int. Cl.
*B61L 27/12*    (2022.01)
*B61L 27/14*    (2022.01)
(Continued)

(52) U.S. Cl.
CPC ............... *B61L 27/16* (2022.01); *B61L 27/12* (2022.01); *B61L 27/14* (2022.01); *B61L 27/40* (2022.01)

(58) Field of Classification Search
CPC .......... B61L 27/12; B61L 27/14; B61L 27/16; B61L 27/40
(Continued)

(56) References Cited

U.S. PATENT DOCUMENTS

2015/0360706 A1* 12/2015 Niinomi .................. B61L 27/12
701/19
2019/0228358 A1    7/2019 Ootsuka et al.
(Continued)

FOREIGN PATENT DOCUMENTS

GB            2508508 A        6/2014
GB            2582158 A        9/2020
(Continued)

OTHER PUBLICATIONS

Hassannayebi, E. et al., "Demand-oriented timetable design for urban rail transit under stochastic demand", Journal of Industrial and Systems Engineering, vol. 9, No. 3, pp. 28-56, Jul. 2016, in 29 pages.

(Continued)

*Primary Examiner* — Erick R Solis
(74) *Attorney, Agent, or Firm* — Procopio, Cory, Hargreaves & Savitch LLP

(57) ABSTRACT

A train operation support system for outputting a rescheduled timetable for a planned timetable of a train from a computer by using the planned timetable and an actual timetable of the train includes a timetable modification unit that modifies the planned timetable by using a given timetable modification method, a passenger flow prediction unit that calculates passenger staying information containing information indicating the number of staying passengers in each time zone at each station, by using demand information indicating a destination of a passenger in each time zone at each station where the train stops, a timetable rescheduling (Continued)

unit that modifies the demand information in reference to the planned timetable modified by the timetable modification unit, inputs the modified demand information to the passenger flow prediction unit, and creates the rescheduled timetable for the planned timetable by using the passenger staying information output from the passenger flow prediction unit, and an output unit that outputs the rescheduled timetable created by the timetable rescheduling unit.

10 Claims, 18 Drawing Sheets

(51) Int. Cl.
  *B61L 27/16* (2022.01)
  *B61L 27/40* (2022.01)
(58) Field of Classification Search
  USPC ............................................................ 701/19
  See application file for complete search history.

(56) References Cited

U.S. PATENT DOCUMENTS

2020/0357091 A1* 11/2020 Minakawa .............. B61L 27/14
2023/0166783 A1*  6/2023 Kubota ................... B61L 27/60
                                                      701/19

FOREIGN PATENT DOCUMENTS

| JP | 2005-280637 A | 10/2005 |
| JP | 2010-018221 A | 1/2010 |
| JP | 2019-177760 A | 10/2019 |
| WO | 2015/063823 A1 | 5/2015 |
| WO | 2020217686 A1 | 10/2020 |

OTHER PUBLICATIONS

Examination Report received in AU Application No. 2021403968; dated Feb. 21, 2024, in 8 pages.
Extended European Search Report received in EP21906070.4; dated Oct. 18, 2024, in 10 pages.

* cited by examiner

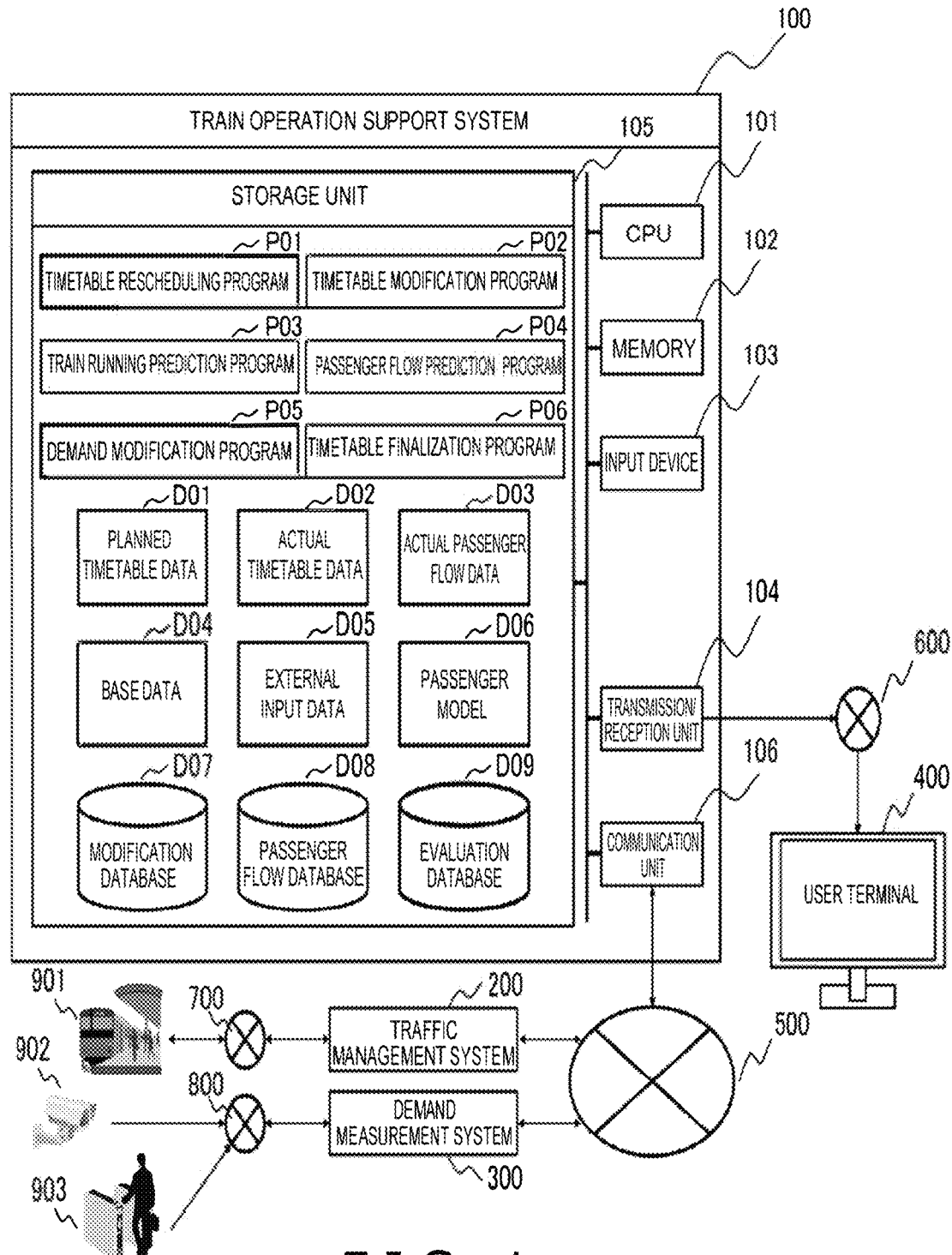
F I G . 1

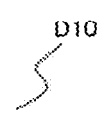
| TRAIN NO. | STATION | PLATFORM | ARRIVAL TIME | DEPARTURE TIME |
|---|---|---|---|---|
| HR101 | St.A | Tr.1 | — | 08:00 |
| HR101 | St.B | Tr.1 | 08:03 | 08:05 |
| HR101 | St.C | Tr.2 | 08:10 | 08:12 |
| ⋮ | ⋮ | ⋮ | ⋮ | ⋮ |
| HR101 | St.W | Tr.1 | 09:42 | 09:45 |
| HR101 | St.Z | Tr.3 | 09:50 | — |
| HR201 | St.X | Tr.1 | — | 08:10 |
| ⋮ | ⋮ | ⋮ | ⋮ | ⋮ |
F I G . 2

TRAIN OPERATION SUPPORT SYSTEM AND TRAIN OPERATION SUPPORT METHOD

CROSS-REFERENCE TO RELATED APPLICATIONS

This application is a US national stage application of International Application PCT/JP2021/032911, filed Sep. 7, 2021, and claims priority to Japanese Patent Application No. 2020-209109, filed Dec. 17, 2020, the contents of which are incorporated by reference.

TECHNICAL FIELD

The present invention relates to a train operation support system and a train operation support method.

BACKGROUND ART

It is extremely important for railway operators to determine appropriate train timetables in achieving safe and efficient transportation services. During a normal time, an automatic control system operates trains in accordance with a planned timetable determined beforehand. Meanwhile, train operators modify planned timetables in some cases according to changes of demands of passengers, occurrence of unexpected transport disorder, or the like. Train operators recreate planned timetables for the purpose of on-demand operation for the former case and disruption management for the latter case (hereinafter referred to as rescheduling work). For achieving this rescheduling work, various limitations, such as resource operational efficiency of relevant departments, travel time of passengers, and congestion inside cars, need to be taken into consideration while a change of traffic conditions of trains is taken into account. Accordingly, creation of rescheduled timetables is extremely difficult.

Particularly in a case where a large-scale disruption of train operation is caused by a car failure, bad weather, or the like, it is difficult to maintain and restore passenger services only by a small-sized modification such as adjustment of arrival and departure times. Accordingly, a large-scale or a wide-range modification of a planned timetable, such as train cancellation and train turnback, needs to be made. In addition, with an increase in density of train operation as a result of train creation and complexity of train operation as a result of an increase in mutual through-service sections in recent years, disruption caused by a certain train easily affects other trains, and rescheduling work is becoming more and more complicated. In addition, for creating more efficient rescheduled timetables, it is essential to simultaneously consider demands of passengers as well as complicated train operation. For example, in a case where the number of trains is insufficient for demands of passengers, a delay may be increased in association with prolongation of time required for getting on and off trains at stations, or congestion of each car may considerably be raised. In this case, some passengers may be unable to get on a train at a station. Accordingly, train operators perform rescheduling work while paying sufficient attention to demands of passengers, typically demands provided as OD data (Origin-Destination data).

For reducing a workload imposed on train operators in the foregoing background, there has been disclosed a technology for supporting creation of rescheduled timetables in which demands of passengers are taken into consideration. For example, a train operation diagram creation support system described in Patent Document 1 discloses the following points. "The train operation diagram creation support system mainly includes a demand measurement prediction device and a diagram creation device to make it possible to appropriately modify a train operation diagram beforehand according to a predicted demand change. The demand measurement prediction device stores demand measurement results received from a demand measurement device and external factor information that is received from an external information reception device 600 and that may affect transportation demands, in such a manner as to associate these results and information with each other. In a case of detection of a modification of the external factor, the demand measurement prediction device predicts the number of riding passengers between stations in a target line section from previous demand measurement results associated with the changed external factor, and stores the predicted number in a passenger flow prediction database. The diagram creation device acquires, from the passenger flow prediction database, a predicted value of the number of the riding passengers between stations for the line section where modification of the external factor has been made, and extracts the corresponding number of trains between stations with reference to a table that is retained beforehand and that indicates numbers of riding passengers to numbers of trains for the corresponding line section." In this manner, it is assumed in Patent Document 1 that "appropriate modification of a train operation diagram beforehand according to a predicted demand change" is achievable.

PRIOR ART DOCUMENT

Patent Document

Patent Document 1: PCT Patent Publication No. WO2015/063823

SUMMARY OF THE INVENTION

Problems to be Solved by the Invention

For creation of planned timetables, criteria reflecting demands of passengers for this purpose include a staying amount of passengers at each station as well as congestion of trains and the number of riding passengers. For example, during disruption, train operators make adjustments for each operation section to prevent staying of passengers at each station. Specifically, when a section where passage is not allowed (hereinafter referred to as a suspended section) is produced on a railway line of a railroad as a result of equipment failure, an accident, or the like, a planned timetable is created in some cases such that a turnback is made not at a station before the suspended section, but at a connection station of another railway line so as to prevent staying of passengers at the station before the suspended section. Moreover, from a viewpoint of prevention of accidents causing injury or death or prevention of infectious diseases, it is preferable to avoid a situation where passengers stay at a particular station. Particularly, for the purpose of preventing unknown infectious diseases different from conventionally known infectious diseases, such as COVID-19 as a typical example, it is necessary to prevent staying of passengers more than ever. Accordingly, it is an important object during creation of planned timetables to adjust a staying amount predicted at each station even in periods other than a disruption period.

According to the train operation diagram creation support system disclosed in Patent Document 1, a method for operation support is achieved only by calculation of the number of trains according to the number of riding passengers (congestion) on each train, and does not describe nor suggest adjustment of a staying amount of passengers at each station. Moreover, the system of Patent Document 1 examines a change of demands produced as a result of weather or an external factor scheduled in the future, such as an event, but does not describe nor suggest a change of demands according to modification contents of a planned timetable. Accordingly, there still remain the following problems.

According to the train operation diagram creation system disclosed in Patent Document 1, the number of trains is calculated using a predicted value of the number of riding passengers between stations. Accordingly, in a case where there exist a certain number of demands for traveling from a start point located at an intermediate station on a railway line, there is a possibility that a staying amount at a specific station increases. For example, in a case where passengers traveling from a first station to a terminal station on a certain railway line and passengers traveling from an intermediate station to the terminal station are mixed, the number of riding passengers between stations is determined to be larger in the section from the intermediate station to the terminal station than in the section from the first station to the intermediate station. Accordingly, if running of trains is limited to the section from the intermediate station to the terminal station, a staying amount at the first station is expected to increase as a result of this limitation.

Secondly, demands of passengers vary according to modification contents of planned timetables. Accordingly, in a case where trains are operated in accordance with rescheduled timetables, there is a possibility that a predicted value of the number of riding passengers between stations is different from an actual number of riding passengers between stations. For example, in a case where a suspended section is produced in modification contents of a planned timetable, a range of the suspended section varies depending on selection of a turnback station. Behaviors of respective passengers vary according to this range of the suspended section. Accordingly, it is expected that an error occurs between an actual number of riding passengers between stations and a predicted value of that number. This is also applicable to a case of prediction of a staying amount at each station. It is predicted that an actual staying amount and a predicted value of that amount differ from each other as a result of no consideration of demands variable according to modification contents of a planned timetable.

Further, demands of passengers include information associated with a departure station (start point) corresponding to a start of traveling and an arrival station (end point) corresponding to a destination of traveling. In a case where the arrival station corresponding to a destination for each passenger is modified according to modification contents of a planned timetable, there is a possibility that a preferable rescheduled timetable is difficult to create. For example, if passengers transfer from an intermediate station to another railway line or other traffic as a result of reduction of the number of trains from that number at the time of planning for elongation of headway of trains, it is expected that a surplus number of trains between stations are operated for the number of riding passengers between stations. This is also applicable to a case of evaluation of a staying amount at each station. It is predicted that a surplus number of trains between stations are set for a staying amount at each station as a result of no consideration for change of an arrival station corresponding to a destination of each passenger according to modification contents of a planned timetable.

Summarizing the above three points, it is a problem to be solved to create a rescheduled timetable while evaluating a staying amount of passengers variable according to modification contents of a planned timetable.

In consideration of the abovementioned circumstances, it is an object of the present invention to provide a train operation support system and a train operation support method for adjusting a staying amount of passengers predicted at each station to a preferable value.

Means for Solving the Problems

A train operation support system according to the present invention is configured as a train operation support system for outputting a rescheduled timetable for a planned timetable of a train from a computer by using the planned timetable and an actual timetable of the train, the train operation support system including a timetable modification unit that modifies the planned timetable according to a given timetable modification method, a passenger flow prediction unit that calculates passenger staying information containing information indicating the number of staying passengers in each time zone at each station, by using demand information indicating a destination of a passenger in each time zone at each station where the train stops, a timetable rescheduling unit that modifies the demand information in reference to the planned timetable modified by the timetable modification unit, inputs the modified demand information to the passenger flow prediction unit, and creates the rescheduled timetable for the planned timetable by using the passenger staying information output from the passenger flow prediction unit, and an output unit that outputs the rescheduled timetable created by the timetable rescheduling unit.

Advantages of the Invention

Achievable according to the present invention is presentation of a rescheduled timetable created by adjusting a predicted staying amount of passengers at each station to a preferable value.

BRIEF DESCRIPTION OF THE DRAWINGS

FIG. 1 is a block diagram depicting a configuration of a train operation support system according to a first embodiment.

FIG. 2 is a chart illustrating an example of timetable data according to the first embodiment.

MODES FOR CARRYING OUT THE INVENTION

Figure 3:
FIG. 3 is a chart illustrating an example of operation data according to the first embodiment.

Embodiments according to the present invention will hereinafter be described with reference to the drawings. The following description and drawings are presented only by way of example for explaining the present invention. Omission and simplification are appropriately made to clarify the explanation. The present invention may be practiced in various different modes. Each of constituent elements may be constituted by either a single piece or a plurality of pieces unless otherwise specified.

A position, a size, a shape, a range, and the like of each of constituent elements depicted in the drawings do not represent a position, a size, a shape, a range, and the like in an actual situation in some cases, for easy understanding of the invention. Accordingly, the invention is not necessarily required to have a position, a size, a shape, a range, and the like disclosed in each of the drawings.

In the following description, each of various types of information is explained by using such expressions as a "table" and a "list" in some cases. However, each of these types of information may be expressed by a data structure other than these. For clarifying no dependency on a data structure, each of an "XX table," an "XX list," and the like is called "XX information" in some cases. In a case where such expressions as "identification information," an "identifier," a "name," an "ID," and a "number" are used for explaining identification information, these expressions may be replaced with each other.

In a case where a plurality of constituent elements each having an identical or a similar function are provided, different suffixes are given to an identical reference number in some cases to explain these constituent elements. However, in a case where no distinction between a plurality of these constituent element is necessary, the suffixes are omitted in some cases in the description.

Moreover, some processes described below are processes achieved by executing a program. In this case, the program is executed by a processor (e.g., CPU (Central Processing Unit) or GPU (Graphics Processing Unit)) to perform predetermined processing with appropriate use of a storage resource (e.g., memory) and/or an interface device (e.g., communication port), for example. Accordingly, these processes may be considered to be performed mainly by a processor. Similarly, the processes achieved by executing the program may be performed mainly by a controller, a device, a system, a calculator, or a node each including a processor. The processes achieved by executing the program may be performed mainly by any unit as long as it is an arithmetic unit. In addition, these processes may each include a dedicated circuit performing a specific process (e.g., FPGA (Field-Programmable Gate Array) and ASIC (Application Specific Integrated Circuit)).

A program may be installed from a program source into a device such as a calculator. For example, the program source may be a program distribution server or a storage medium readable by a calculator. In a case where the program source is a program distribution server, the program distribution server may include a processor and a storage resource for storing distribution target programs, and the processor of the program distribution server may distribute the distribution target programs to other calculators. Furthermore, in the following description, two or more programs may be implemented as one program, or one program may be implemented as two or more programs.

Embodiment 1

A first embodiment of the present invention will hereinafter be described in detail.

(1.1 System Configuration)

FIG. 1 is a diagram depicting a system configuration according to the first embodiment of the present invention.

In this figure, a reference number 100 denotes a train operation support system, a reference number 200 denotes a traffic management system, a reference number 300 denotes a demand measurement system, a reference number 400 denotes a user terminal, each of reference numbers 500, 600, 700, and 800 denotes a communication network, a reference number 101 denotes a CPU (central processing unit), a reference number 102 denotes a memory, a reference number 103 denotes an input device, a reference number 104 denotes a transmission/reception unit, a reference number 105 denotes a storage unit, and a reference number 106 denotes a communication unit.

The train operation support system 100, the traffic management system 200, and the demand measurement system 300 are connected to each other to establish mutual communication via the communication network 500.

The train operation support system 100 appropriately creates or updates a rescheduled timetable for a planned timetable in reference to information acquired from the traffic management system 200, information acquired from the demand measurement system 300, and information input from the user terminal 400, and outputs the created or updated rescheduled timetable from the transmission/reception unit 104 to a display of the user terminal 400 via the communication network 600.

The traffic management system 200 is connected to a plurality of trains 901 via the communication network 700 to establish mutual communication with the trains 901. The traffic management system 200 controls the plurality of trains 901 within a train operation network corresponding to a management target in accordance with the planned timetable. The traffic management system 200 notifies the train operation support system 100 of various types of information associated with train operation management via the communication network 500.

The demand measurement system 300 is connected to a sensor 902 and a sensor 903 via the communication network 800 to establish mutual communication with the sensors 902 and 903. For example, the sensor 902 is a monitoring camera, while the sensor 903 is an automatic ticket gate. Note that an infrared device and a load compensating device equipped on each train as sensors, a portable terminal carried by each passenger, or the like is available as each of the sensors. The demand measurement system 300 is capable of collecting sensor information received from the sensor 902 and the sensor 903. The demand measurement system 300 notifies the train operation support system 100 of various types of information associated with passenger flow information via the communication network 500.

The train operation support system 100 is implementable by an ordinary computer as hardware, which includes the CPU 101, the memory 102, the input device 103, the transmission/reception unit 104, the storage unit 105, and the communication unit 106.

The CPU (central processing unit) 101 is a processing unit which executes various types of software programs stored in the storage unit 105. The memory 102 is a storage device constituting a work area for the CPU 101. The CPU 101 writes data to the memory 102 or reads data from the memory 102 at the time of execution of the software programs.

The input device 103 is a device operated by an operator of the train operation support system 100 to give instructions or input data to the train operation support system 100. For example, the input device 103 includes a keyboard and a mouse. The mouse is a type of a device generally called a pointing device, and adopted in the first embodiment of the present invention. However, other types of pointing devices, such as a trackball, a pointing stick, a touch pad, a touch panel, and a pen-tablet, are available.

The transmission/reception unit 104 establishes communication between the train operation support system 100 and different terminals. For example, the transmission/reception unit 104 may include such hardware as NIC (Network Interface Card).

The storage unit 105 is a storage device where various types of programs executed by the CPU 101 and various types of data used by the CPU 101 for processing are stored. Note that data or the like saved in the storage unit 105 and read therefrom is copyable to the memory 102. Moreover, data or the like saved in the memory 102 and written therefrom is copyable to the storage unit 105. Accordingly, in a case where data or the like is saved in the storage device, it is assumed hereinafter that this data or the like is readable from both the memory 102 and the storage unit 105. Moreover, in a case where data or the like is to be read from the storage device, it is assumed that the data or the like to be read is data saved in either the memory 102 or the storage unit 105.

The communication unit 106 is connected to the communication network 500, and establishes communication of the train operation support system 100 with the traffic management system 200 and the demand measurement system 300 via the communication network 500. The communication unit 106 may include hardware similar to that of the transmission/reception unit 104.

A timetable rescheduling program P01, a timetable modification program P02, a train running prediction program P03, a passenger flow prediction program P04, a demand modification program P05, a timetable finalization program P06, planned timetable data D01, actual timetable data D02, actual passenger flow data D03, base data D04, external input data D05, a passenger model D06, a modification database D07, a passenger flow database D08, and an evaluation database D09 are stored in the storage unit 105.

The timetable rescheduling program P01 is a software program executed by the CPU 101 to achieve creation of a rescheduled timetable. A timetable rescheduling process is a process for creating a rescheduled timetable for a planned timetable in reference to the planned timetable data D01, the actual timetable data D02, the actual passenger flow data D03, the base data D04, the external input data D05, and the passenger model D06. Details of the timetable rescheduling process will be described later.

The timetable modification program P02 is a software program executed by the CPU 101 to achieve a timetable modification process. The timetable modification process is a process for creating modification candidates of a planned timetable in reference to the planned timetable data D01, the actual timetable data D02, the base data D04, and the external input data D05. The timetable modification process modifies a planned timetable in reference to information associated with a given timetable modification method. The timetable modification process may be practiced using a known technology. For example, the timetable modification method is a method adopted to modify a planned timetable, such as a method to delay a departure time of a train and a method to change a running order of a train. Moreover, the timetable modification method may be determined as a single modification, or a combination of a plurality of modifications, for example.

The train running prediction program P03 is a software program executed by the CPU 101 to achieve a train running prediction process. The train running prediction process is a process for predicting future train operation in reference to the planned timetable data D01, the actual timetable data D02, the base data D04, and the external input data D05. The train running prediction process may be practiced using a known technology.

The passenger flow prediction program P04 is a software program executed by the CPU 101 to achieve a passenger flow prediction process. The passenger flow prediction process is a process for predicting passenger flow information, such as the number of riding passengers on each train and the number of staying passengers at each station, in reference to the planned timetable data D01, the actual timetable data D02, the actual passenger flow data D03, the base data D04, and the external input data D05. The passenger flow prediction process may be practiced using a known technology.

The demand modification program P05 is a software program executed by the CPU 101 to achieve a demand modification process. The demand modification process is a process for modifying demand information in reference to modification candidates of a planned timetable created within the timetable rescheduling process and the passenger model D06. Details of the demand modification process will be described later.

The timetable finalization program P06 is a software program executed by the CPU 101 to achieve a timetable finalization process. The timetable finalization process is a process for reflecting modification executed by the user for a rescheduled timetable created by the timetable rescheduling process, in an actual planned timetable. When modification to be executed is selected by the user, the timetable finalization process refers to the modification database D07, and reflects corresponding modification contents in a planned timetable.

The planned timetable data D01 is data indicating advance planning of what time and where each train is scheduled to arrive or depart and with which of other trains each train is scheduled to have a connection relation. The planned timetable data D01 contains such data as timetable data in a planning stage (FIG. 2) and operation data in a planning stage (FIG. 3). Details of the timetable data and the operation data will be described later.

The actual timetable data D02 is data indicating actual performance of what time and where each train arrived or departed and with which of other trains each train had a connection relation. The actual timetable data D02 contains such data as timetable data and operation data. Details of certain timetable data in an actual timetable (FIG. 2) and certain operation data in an actual timetable (FIG. 3) will be described later.

The actual passenger flow data D03 is data indicating actual performance concerning from which station to which station and from what time each passenger desires to travel, how many passengers rode on each train and where each train departed, and how many passengers stay at each station and from what time to what time these passengers stay. The actual passenger flow data D03 contains such data as demand data (FIG. 4), passenger riding data (FIG. 5), and passenger staying data (FIG. 6). Details of the demand data, the passenger riding data, and the passenger staying data will be described later.

The base data D04 is data indicating information as a basis of a process associated with facilities. For example, the base data D04 contains such data as identification information associated with facilities (e.g., ID codes for stations, platforms, and railway lines), travel route information (e.g., station arrangement for each railway line and each inbound/outbound direction, platforms to be used, railway lines to be used, information indicating stop or passage at each station), turnback facility information, and time information (e.g., regular running time, minimum stop time, interval time). The turnback facility information is so configured as to contain information indicating at which station on a running route each train is allowed to turn back. The regular running time is a minimum time required for a certain train to reach the next station after departure from a certain station. A value corresponding to each pair of adjoining stations is calculated using a train running simulator or the like, and stored as the regular running time. Note that a reference value of a time required for a certain train to reach the next station after departure from a certain station, with a margin time given, may be used as the regular running time. The minimum stop time is a minimum time required for a certain train to depart from a certain station after arrival at this station in a case where this train stops at this station. The minimum stop time may be a value common to all trains at all stations, or a value different for each time zone or congestion.

The external input data D05 is data that is input from the outside and that indicates conditions at the time of timetable rescheduling creation. For example, the external input data D05 contains such data as transport disorder information and threshold information. The transport disorder information is data indicating transport disorder, i.e., at what time and where each train is unable to run. The transport disorder information may be designated in reference to such information as a time range and a target section (e.g., a section between stations) in which each train is unable to run, or may be designated in reference to information associated with a facility (e.g., station, platform, railway line) or a car where an accident or a failure has been caused, for example. The threshold information includes various parameters designated at the time of timetable rescheduling creation. For example, the threshold information contains such data as a time range or a target section for which a planned timetable is recreated.

The passenger model D06 is a model which indicates how each passenger changes his or her behavior according to traffic conditions. For example, the passenger model D06 contains such information as feature values of a planned timetable and modification contents of passenger behaviors. Details of the passenger model D06 will be described later with reference to FIG. 7.

The modification database D07 is a database which retains modification data, timetable modification log data, and the like. Modification data created beforehand is stored in the modification database D07 beforehand. Timetable modification log data is stored as necessary for modification made at the time of timetable rescheduling creation. Information which associates the timetable modification log data with a planned timetable corresponding to this data is further stored in the modification database D07. The modification data is data indicating candidates of a timetable modification method corresponding to traffic conditions. For example, timetable modification methods as candidates are registered in the modification data for each combination of target sections in the transport disorder information. The timetable modification log data is data indicating the timetable modification method applied at the time of timetable rescheduling creation. Details of the timetable modification log data will be described later with reference to FIG. 8.

The passenger flow database D08 is a database which retains actual passenger flow data, passenger flow prediction data, and the like. Various kinds of measured or predicted data are stored in the passenger flow database D08 as necessary. Actual passenger flow data previously measured is further stored in the passenger flow database D08. As described above, the actual passenger flow data includes data concerning actual performance of demand data, passenger riding data, passenger staying data, and the like. The actual passenger flow data includes data associated with prediction results of demand data, passenger riding data, passenger staying data, and the like.

The evaluation database D09 is a database which retains evaluation data, respective criterion data, and the like. Various kinds of calculated data are stored in the evaluation database D09 as necessary. Information which associates evaluation data and respective pieces of criterion data with a planned timetable corresponding to these pieces of data is further stored in the evaluation database D09. The evaluation data is data indicating an evaluation value of staying, an evaluation value of train congestion, an evaluation value of train delay, an evaluation value of operational cost, and an overall evaluation value of these values. The criterion data is data indicating a calculation result of a criterion concerning a staying amount at each station, congestion of each train, a delay time of each train, each operational cost, and the like.

(1.2 Data Structure)

An example of a data structure will first be touched upon before description of processes.

(1.2.1 Data Structure of Timetable Data)

An example of a data structure of timetable data D10 will be described with reference to FIG. 2. Each of timetable data stored in the planned timetable data D01 and timetable data stored in the actual timetable data D02 includes this data structure.

As depicted in FIG. 2, the timetable data D10 contains "train no.," "station," "platform," "arrival time," and "departure time." Information specified in each column of the timetable data D10 will hereinafter be described.

A train number of a target train is specified in "train no." For example, FIG. 2 depicts a part of description associated with "train no." of "HR101" and "HR102."

A name of a station associated with arrival, departure, passage, and the like of the corresponding train is specified in "station." For example, items associated with "station" of "St. A" are described in the first row in FIG. 2, while items associated with "station" of "St. B" are described in the second row in FIG. 2.

A name of a platform associated with arrival, departure, passage, and the like of the corresponding train is specified in "platform." For example, items associated with "platform of "Tr. 1" are described in the second row in FIG. 2, while items associated with "platform of "Tr. 2" are described in the third row in FIG. 2.

A time at which the corresponding train arrives at the corresponding station is specified in "arrival time." Note that a marker indicating no data, such as "-," is input in a case where no arrival time is allocated, such as a case of a starting station and a non-stop station.

A time at which the corresponding train departs from the corresponding station is specified in "departure time." Note that a marker indicating no data, such as "-," is input in a case where no departure time is allocated, such as a case of a terminal station. The departure time may contain a passage time, or a different field, which is not separately depicted in FIG. 2, may be prepared as a field for a passage time.

An example of the timetable data D10 will be described with reference to FIG. 2. For example, the first row in FIG. 2 indicates that the train having "train no." of "HR101" departs from a platform as "platform" of "Tr. 1" of a station as "station" of "St. A" at "departure time" of "08:00," while the second row in FIG. 2 indicates that the train having "train no." of "HR101" arrives at "platform" of "Tr. 1" of a station as "station" of "St. B" at "arrival time" of "08:03" and departs at "departure time" of "08:05." FIG. 2 includes omitted parts indicated by ellipsis points. In practice, however, there are at least the same number of rows as the number of combinations each including the number of trains and the number of stations associated with arrival, departure, passage, and the like of the corresponding trains.

(1.2.2 Data Structure of Operation Data)

An example of a data structure of operation data D20 will be described with reference to FIG. 3. Each of operation data stored in the planned operation data D01 and operation data stored in the actual timetable data D02 includes this data structure.

As depicted in FIG. 3, the operation data D20 contains "train no.," "previous operation train," and "next operation train." Information specified in each column of the operation data D20 will hereinafter be described.

A train number of a target train is specified in "train no." For example, FIG. 3 depicts a part of description associated with "train no." of "HR101," "HR102," "HR103," "HR705," "HR706," and "HR707."

A train number of a previous operation train of a target train is specified in "previous operation train." The previous operation train here refers to a train which runs immediately before a target train among trains each using the same cars (or car sets) as those of the target train. For example, described in the second row in FIG. 3 is that the train of "HR101" which uses the same cars runs immediately before the train of "HR102," such as a case of running until a destinated arrival station and turning back from this destinated arrival station. Note that a marker indicating no data, such as "-," is input in a case where no previous operation train is allocated.

A train number of a next operation train of a target train is specified in "next operation train." The next operation train here refers to a train which runs immediately after a target train among trains each using the same cars (or car sets) as those of the target train. For example, described in the second row in FIG. 3 is that the train of "HR103" which uses the same cars runs immediately after the train of "HR102," such as a case of running until a destinated arrival station and turning back from this destinated arrival station. Note that a marker indicating no data, such as "-," is input in a case where no next operation train is allocated.

An example of the operation data D20 will be described with reference to FIG. 3. For example, the first row in FIG. 3 indicates that there is no "previous operation train" for the train having "train no." of "HR101" and that "next operation train" of "HR102" is a train which uses the same cars and runs immediately after the train "HR101." The second row in FIG. 3 indicates that "previous operation train" of "101" is a train which uses the same cars and runs immediately before the train "HR102" and that "next operation train" of "HR103" is a train which uses the same cars and runs immediately after the train "HR102." FIG. 3 includes omitted parts indicated by ellipsis points. In practice, however, there are at least the same number of rows as the number of trains.

(1.2.3 Data Structure of Demand Data)

An example of a data structure of demand data D30 will be described with reference to FIG. 4. The demand data D30 is data where information associated with demands of passengers is stored.

Figure 4:
FIG. 4 is a chart illustrating an example of demand data according to the first embodiment.

As depicted in FIG. 4, the demand data D30 contains "passenger ID," "departure station," "arrival station," "departure time," and "travel route." Information specified in each column of the demand data D30 will hereinafter be described.

A passenger ID of a target passenger is specified in "passenger ID." For example, FIG. 4 depicts a part of description associated with "passenger ID" of "1," "2," "3," "51," "52," and "53."

A name of a station where the corresponding passenger departs at the time of traveling is specified in "departure station." For example, items associated with "departure station" of "St. A" are described in the first row in FIG. 4, while items associated with "station" of "St. C" are described in the second row in FIG. 4.

A name of a station where the corresponding passenger arrives at the time of traveling is specified in "arrival station." For example, items associated with "arrival station" of "St. Z" are described in the first row in FIG. 4, while items associated with "arrival station" of "St. L" are described in the second row in FIG. 4.

A time when the corresponding passenger enters the departure station is specified in "departure time." For example, items associated with "departure time" of "07:58" are described in the first row in FIG. 4, while items associated with "departure time" of "08:00" are described in the second row in FIG. 4.

Information containing a name of a railway line and names of a boarding station and an exit station used by the corresponding passenger is specified in "travel route." For example, items associated with a travel route of getting on a train at "St. A" on a railway line having a railway line name of "Line B" and getting off the train at "St. Z" are described in the first row, while items associated with a travel route of getting on a train at "St. C" on the railway line having a railway line name of "Line B" and getting off the train at "St. L" are described in the second row. FIG. 4 includes omitted parts indicated by ellipsis points. In practice, however, there are at least the same number of rows as the number of passengers. It is assumed here that all railway lines to be used are described for passengers each using a plurality of railway lines. However, in a case where an actual travel route for each of these passengers is unknown, a travel route may be set for only one pair of a departure station and an arrival station.

An example of the demand data D30 will be described with reference to FIG. 4. For example, the first row in FIG. 4 indicates that a passenger having "passenger ID" of "1" travels from "departure station" of "ST. A" to "arrival station" of "St. Z" at "departure time" of "07:58" along "travel route" of "Line B—St. A—St. Z." FIG. 4 includes omitted parts indicated by ellipsis points. In practice, however, there are at least the same number of rows as the number of passengers.

Note that the demand data D30 may collectively define data of passengers each having the same "departure station," "arrival station," "departure time," and "travel route." At this time, for example, the demand data D30 has data regarding "trip no." instead of "passenger ID," and has new data regarding "number of passengers" to define identical demands. In this manner, collective processing of identical demands is achievable. Accordingly, processing speed associated with calculation of demands is allowed to increase.

(1.2.4 Data Structure of Passenger Riding Data)

An example of a data structure of passenger riding data D40 will be described with reference to FIG. 5. The passenger riding data D40 is data where information associated with trains on which passengers ride is stored.

Figure 5:
FIG. 5 is a chart illustrating an example of passenger riding data according to the first embodiment.
Figure 6:
FIG. 6 is a chart illustrating an example of passenger staying data according to the first embodiment.

As depicted in FIG. 5, the passenger riding data D40 contains "train no.," "railway line," "station," "running order," and "number of passengers." Information specified in each column of the passenger riding data D40 will hereinafter be described.

A train number of a target train is specified in "train no." For example, FIG. 5 depicts a part of description associated with "train no." of "HR101" and "HR102."

A name of a railway line along which the corresponding train runs is specified in "railway line." For example, items associated with running of the train of "HR101" along the railway line of "Line B" are described in the first row in FIG. 5.

A name of a station associated with departure of the corresponding train is specified in "station." For example, items associated with "station" of "St. A" are described in the first row in FIG. 5, while items associated with "station" of "St. B" are described in the second row in FIG. 5.

A number indicating an order of the corresponding train running at each station is specified in "running order." For example, items associated with "running order" of "first" are described in the first row in FIG. 5, while items associated with "running order" of "second" are described in the second row in FIG. 5.

The number of riding passengers when the corresponding train departs from the corresponding station is specified in "number of passengers." For example, items associated with "number of passengers" of "200" are described in the first row in FIG. 5, while items associated with "number of passengers" of "225" are described in the second row in FIG. 5.

An example of the passenger riding data D40 will be described with reference to FIG. 5. For example, the first row in FIG. 5 indicates that the station is a station associated with arrival, departure, passage, and the like of the train having "train no." "HR101" in "running order" of "first" when this train departs from "station" of "St. A" along "railway line" of "Line B" and that "200" passengers as "number of passengers" are riding on this train. The second row in FIG. 5 indicates that the station is a station associated with arrival, departure, passage, and the like of the train having "train no." "HR101" in "running order" of "second" when this train departs from "station" of "St. B" along "railway line" of "Line B" and that "225" passengers as "number of passengers" are riding on this train. FIG. 5 includes omitted parts indicated by ellipsis points. In practice, however, there are at least the same number of rows as the number of combinations each including the number of trains and the number of stations associated with arrival, departure, passage, and the like of the corresponding trains.

(1.2.5 Data Structure of Passenger Staying Data)

An example of a data structure of passenger staying data D50 will be described with reference to FIG. 6. The passenger staying data D50 is data where information associated with staying of passengers is stored.

As depicted in FIG. 6, the passenger staying data D50 contains "station," "time," "arrival station," and "number of passengers." Information specified in each column of the passenger staying data D50 will hereinafter be described.

A station name for individually identifying each station is specified in "station." For example, FIG. 6 depicts a part of description associated with "station" of "St. X," "St. N," and "St. O."

A time when the number of staying passengers at the corresponding station is recorded is specified in "time." For example, items associated with "time" of "10:00" are described in the first row in FIG. 6, while items associated with "time" of "10:15" are described in the second row in FIG. 6. Note that "time" is recorded by using a time unit of total determined beforehand (e.g., unit of one minute, five minutes, or 10 minutes).

A name of a station to which passengers staying at the corresponding station intend to travel is specified in "arrival station." For example, items associated with "arrival station" of "St. Y" are described in the first row in FIG. 6, while items associated with "arrival station" of "St. Z" are described in the second row in FIG. 6.

The number of passengers intending to travel from the corresponding station to each arrival station at each time is specified in "number of passengers." For example, items associated with "number of passengers" of "60" are described in the first row in FIG. 6, while items associated with "number of passengers" of "40" are described in the second row in FIG. 6.

An example of the passenger staying data D50 will be described with reference to FIG. 6. For example, the first row in FIG. 6 indicates that "60" passengers as "number of passengers" intending to travel to "arrival station" of "St. Y" are staying at "station" of "St. X" at "time" of "10:00." The second row in FIG. 6 indicates that "40" passengers as "number of passengers" intending to travel to "arrival station" of "St. Z" are staying at "station" of "St. X" at "time" of "10:15." FIG. 6 includes omitted parts indicated by ellipsis points. In practice, however, there are at least the same number of rows as the number of combinations each including the number of stations, the time, and the arrival station.

Note that the passenger staying data D50 may collectively define pieces of data regarding staying amounts each having the same "station" and "time." Specifically, for example, the passenger staying data D50 eliminates data regarding "arrival station," and newly defines, as data regarding "number of passengers," a value calculated by adding data regarding "number of passengers" to data having the same "station" and "time." In this manner, collective processing for a staying amount for each pair of the same station and time is achievable. Accordingly, processing speed associated with calculation of staying amounts increases.

(1.2.6 Data Structure of Passenger Model)

Figure 7:
FIG. 7 is a chart illustrating an example of a passenger model according to the first embodiment.

An example of a data structure of passenger model D60 will be described with reference to FIG. 7. The passenger model D60 is data where characteristics of passenger behaviors are stored. FIG. 7 depicts an example of a passenger model for a certain type of passengers. The passenger model D60 is stored beforehand for each type of passengers.

As depicted in FIG. 7, the passenger model D60 contains "start point of suspended section," "end point of suspended section," "waiting time," "transfer station," and "detour time." Information specified in each column of the passenger model D60 will hereinafter be described.

A name of a station corresponding to a start point of a suspended section in a planned timetable is specified in "start point of suspended section." For example, FIG. 7 depicts a part of description associated with "start point of suspended section" of "St. A," "St. N," and "St. O."

A name of a station corresponding to an end point of the suspended section in the planned timetable is specified in "end point of suspended section." For example, FIG. 7 depicts a part of description associated with "end point of suspended section" of "St. B," "St. C," and "St. M."

A time for which passengers need to wait for a train at the corresponding start point of the suspended section is specified in "waiting time." For example, items associated with "waiting time" of "10" minutes are described in the first row in FIG. 7, while items associated with "waiting time" of "30" minutes are described in the second row in FIG. 7. Note that "waiting time" is set by using a time unit of total determined beforehand (e.g., unit of one minute, five minutes, or 10 minutes). Note that a time for which each passenger needs to wait for a train at a departure station may be set for "waiting time," for example, rather than the time for which each passenger needs to wait for a train at the corresponding start point of the suspended section.

Specified in "transfer station" are a pair of stations where passengers transfer in a case where conditions of the corresponding start point of the suspended section, the corresponding end point of the suspended section, and the waiting time agree with contents of a planned timetable. For example, items associated with "transfer station" of "(St. A, St. A)" are described in the first row in FIG. 7, while items associated with "transfer station" of "(St. A, St. C)" are described in the second row in FIG. 7. In this case, "(St. A, St. A)" indicates that a passenger gets on a train at a departure station and temporarily gets off the train at "St. A," waits for a different train at "St. A" until a start of operation, gets on the different train at "St. A" after a restart of operation, and gets off the different train at an arrival station. Moreover, "(St. A, St. C)" indicates that a passenger gets on a train at a departure station, temporarily gets off the train at "St. A," detours from "St. A" within a target railway line to "St. C" within the target railway line by using a different travel route located out of the target railway line, gets on a train at "St. C" after the detour, and gets off the train at an arrival station. Note that a marker indicating elimination of a demand, such as "*," is input in a case of modification of a departure spot or an arrival spot for traveling of a passenger within a target railway line. For example, "transfer station" of "(St. A, *)" is specified in the third row in FIG. 7. This indicates that a passenger gets on a train at a departure station and temporarily gets off the train at "St. A," and that a demand of traveling to an arrival spot within a target railway line is subsequently eliminated after the passenger gets off the train. For example, this case expresses such a result as traveling to a destination with use of only a travel route located out of a target railway line when a station located out of the target railway line exists near the destination in addition to an arrival station, and change of a destination to a different place when a station itself designated as a destination is contained in a suspended section. Note that a plurality of pairs of stations for transfer may be set for "transfer station" in a case where transfer from a station within a target railway line to the outside of the target railway line occurs a plurality of times, for example.

A time required for passengers to detour along a travel route located out of a target railway line is specified in "detour time." For example, items associated with "detour time" of "0" minutes are described in the first row in FIG. 7, while items associated with "detour time" of "10" minutes are described in the second row in FIG. 7. Note that a time required for respective detours corresponding to respective transfers may be set in plural number for "detour time" in a case where transfer from a station within a target railway line to the outside of the target railway line occurs a plurality of times, for example.

An example of the passenger model D60 will be described with reference to FIG. 7. For example, the first row in FIG. 7 indicates that a demand of a passenger is divided into a demand for traveling from a departure station to "St. A" and a demand for traveling from "St. A" to an arrival station as set in "transfer station" of "(St. A, St. A)" in a case where a suspended section in a planned timetable is defined by "start point of suspended section" of "St. A" and "end point of suspended section" of "St. B" with "waiting time" of "10" minutes, and that no time is required for detour along a travel route located out of a target railway line under "detour time" of "0" minutes. In addition, the second row in FIG. 7 indicates that a demand of a passenger is divided into a demand for traveling from a departure station to "St. A" and a demand for traveling from "St. C" to an arrival station as set in "transfer station" of "(St. A, St. C)" in a case where the suspended section in the planned timetable is defined by "start point of suspended section" of "St. A" and "end point of suspended section" of "St. B" with "waiting time" of "30" minutes, and that "detour time" of only "10" minutes is required for detour along a travel route located out of the target railway line. FIG. 7 includes omitted parts indicated by ellipsis points. In practice, however, there are at least the same number of rows as the number of combinations each including the start point of the suspended section, the end point of the suspended section, and the waiting time.

A plurality of the passenger models D60 are created for respective characteristic of passenger behaviors one for each. For example, each of the passenger models D60 here may be statistically created in reference to surveys totaled beforehand, or may be created using GPS (Global Positioning System) data received from portable terminals, data obtained from a travel route search application, or the like. Moreover, for example, conditions and results of passenger behaviors in the passenger model D60 may be adjusted using data obtained from automatic ticket gates or monitoring cameras equipped at stations, infrared devices and load compensating devices mounted on respective trains, and portable terminals carried by respective passengers.

Note that the passenger model D60 may contain the following data items other than those depicted in FIG. 7. For example, the passenger model D60 may additionally include items corresponding to conditions which may change passenger behaviors, such as a departure station and an arrival station of a passenger, delay conditions of a train, congestion conditions at a train and a station, and fares required for traveling. Moreover, the passenger model D60 may retain data items indicating whether or not passengers recognize each information. These items subdivide conditions of passenger behaviors, thereby expressing more accurate results of passenger behaviors.

(1.2.7 Data Structure of Timetable Modification Log Data)

An example of a data structure of timetable modification log data D70 will be described with reference to FIG. 8.

Figure 8:
FIG. 8 is a chart illustrating an example of timetable modification log data according to the first embodiment.

As depicted in FIG. 8, the timetable modification log data D70 contains "timetable modification method," "time," "train," and "KPI." Information specified in each column of the timetable modification log data D70 will hereinafter be described.

A name of a timetable modification method practiced in recreation of a planned timetable is specified in "timetable modification method." For example, FIG. 8 depicts a part of description associated with "timetable modification method" of "PT9000," "PT1185," and "PT1192."

A time when the timetable modification method is practiced in the planned timetable is specified in "time." For example, items associated with "time" of "10:00-10:20" are described in the first row in FIG. 8, while items associated with "time" of "10:15-10:30" are described in the second row in FIG. 8.

A train involved in the modification by the corresponding timetable modification method is specified in "train." For example, items associated with "train" of "HR301" are described in the first row in FIG. 8, while items associated with "train" of "HR302" are described in the second row in FIG. 8. In addition, in a case where a plurality of trains involved in the modification are present, for example, the plurality of trains may collectively be set for "train" in a list form, a dictionary form, or the like, or a train as a reference of modification, a train running at an earliest running time, or the like may be set as a typical train.

A variation of an evaluation value produced by the corresponding timetable modification method is specified in "KPI." For example, items associated with "KPI" of "−25" are described in the first row in FIG. 8, while items associated with "KPI" of "−60" are described in a second row in FIG. 8.

An example of the timetable modification log data D70 will be described with reference to FIG. 8. For example, the first row in FIG. 8 indicates that an evaluation value has changed by an amount of "KPI" of "−25" as a result of modification involving several trains including "train" of "HR301" in a range of "time" of "10:00-10:20" by "timetable modification method" of "PT9000." The second row in FIG. 8 indicates that an evaluation value has changed by an amount of "KPI" of "−60" as a result of modification involving several trains including "train" of "HR302" in a range of "time" of "10:15-10:30" by "timetable modification method" of "PT1185." FIG. 8 includes omitted parts indicated by ellipsis points. In practice, however, there are at least the same number of rows as the number of the practiced timetable modification methods for a certain recreated plan.

(1.2.8 Data Structure of Staying Amount Evaluation Data)

An example of a data structure of the staying amount evaluation data D80 will be described with reference to FIG. 9. The staying amount evaluation data D80 is data obtained by evaluating passengers staying in each time zone including a time described in the passenger staying data D50 depicted in FIG. 6.

Figure 9:
FIG. 9 is a chart illustrating an example of staying amount evaluation data according to the first embodiment.

As depicted in FIG. 9, the staying amount evaluation data D80 contains "station," "time," "number of staying passengers," "density," and "maximum number of passengers." Information specified in each column of the timetable modification log data D70 will hereinafter be described.

A station name for individually identifying each station is specified in "station." For example, FIG. 9 depicts a part of description associated with "station" of "St. X," "St. N," and "St. O."

A time corresponding to a calculation range of a criterion for staying is specified in "time." For example, items associated with "time" of "10:00-11:00" are described in the first row in FIG. 9, while items associated with "time" of "11:00-12:00" are described in the second row in FIG. 9.

The number of passengers staying within the corresponding time at the corresponding station is specified in "number of staying passengers." For example, items associated with "number of staying passengers" of "100" are described in the first row in FIG. 9, while items associated with "number of staying passengers" of "80" are described in the second row in FIG. 9. In addition, for example, set for "number of staying passengers" may be a total number or an average number of passengers staying within the corresponding time at the corresponding station according to a calculation unit, the number of passengers in an individual time unit, or the like, or the number of passengers calculated for each of stations where individual passengers are staying, to avoid duplicated calculation of an identical passenger, for example.

A value indicating a level of congestion of passengers staying within the corresponding time at the corresponding station is specified in "density." For example, items associated with "density" of "0.10" are described in the first row in FIG. 9, while items associated with "density" of "0.08" are described in the second row in FIG. 9. In addition, set for "density" may be the number of staying passengers per unit area at the corresponding station, the number of staying passengers per unit volume in a three-dimensional space at the corresponding station, or the like, or a ratio of the number of staying passengers to the maximum capacity of the corresponding station, a target value set beforehand, or the like, for example.

The maximum number of passengers staying within the corresponding time at the corresponding station is specified in "maximum number of passengers." For example, items associated with "maximum number of passengers" of "180" are described in the first row in FIG. 9, while items associated with "maximum number of passengers" of "135" are described in the second row in FIG. 9.

An example of the passenger staying data D80 will be described with reference to FIG. 9. For example, the first row in FIG. 9 indicates that "100" passengers as "number of staying passengers" stay at "station" of "St. X" at "time" of "10:00-11:00," that passengers stay with "density" of "0.10," and that "180" passengers as "maximum number of passengers" temporarily stay. The second row in FIG. 9 indicates that "80" passengers as "number of staying passengers" stay at "station" of "St. X" at "time" of "11:00-12:00," that passengers stay with "density" of "0.08," and that "135" passengers as "maximum number of passengers" temporarily stay. FIG. 9 includes omitted parts indicated by ellipsis points. In practice, however, there are at least the same number of rows as the number of combinations each including the station and the time.

(1.3 Railway Line and Traffic Conditions to which Embodiment is Applied)

Traffic conditions of a railroad to which the present embodiment is applied will next be described with reference to an example of a railway line depicted in FIG. 10.

Figure 10:
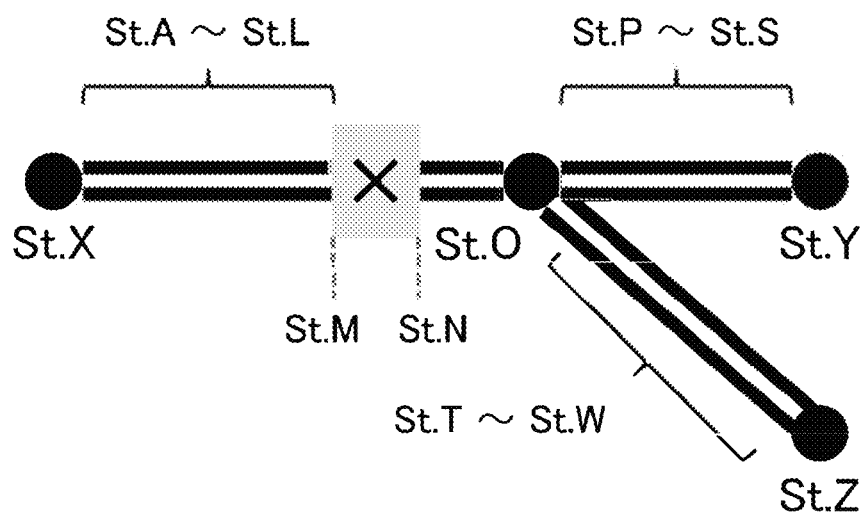
FIG. 10 is a chart illustrating an example of a train railway line and traffic conditions to which the first embodiment is applied.

The example of the railway line depicted in FIG. 10 has a Y-shaped railway line structure, and has "St. X," "St. Y," and "St. Z" as endpoint stations. Moreover, a railway line extending from "St. X" is branched at "St. O" into two directions toward "St. Y" and "St. Z." According to the example of the railway line depicted in FIG. 10, stations from "St. A" to "St. N" between "St. X" and "St. O," stations from "St. P" to "St. S" between "St. O" and "St. Y," and stations from "St. T" to "St. W" between "St. O" and "St. Z" are present in an alphabetical order.

According to the example of the railway line depicted in FIG. 10, it is represented that the railway line is unavailable as a result of transport disorder caused between "St. M" and "St. N" in in-bound and out-bound directions. At this time, each train is in such a situation as to be unable to run between "St. M" and "St. N" until the transport disorder is eliminated.

Note that characteristics of railway lines and traffic conditions are not limited to those described above. For example, the present embodiment is applicable to a railway line such as a single line, a loop line, and a railway line having a complicated railway line structure or is applicable to a case where no transport disorder has been caused or a case where transport disorder has been caused in a different section or a different direction instead of the section and the direction depicted in FIG. 10.

(1.4 Processing by Train Operation Support System)

An outline of actions performed by the train operation support system 100 described above will next be described.

(1.4.1 Outline)

Figure 11:
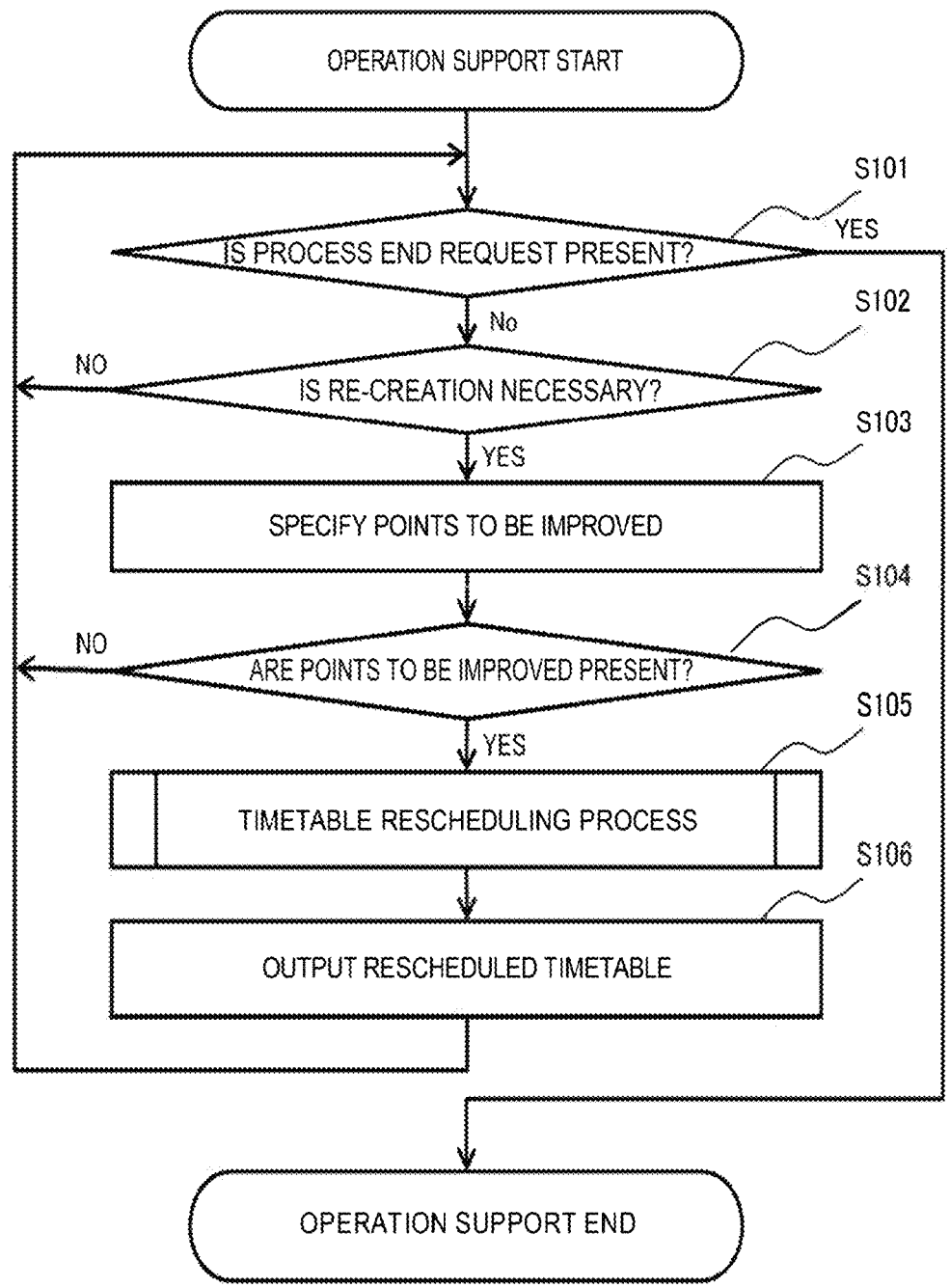
FIG. 11 is a flowchart illustrating an outline of a process performed by the train operation support system according to the first embodiment.

FIG. 11 is a flowchart for explaining an outline of actions performed by the train operation support system 100 depicted in FIG. 1.

Step S101 is processing performed by the CPU 101 of the train operation support system 100 depicted in FIG. 1 to examine presence or absence of a process end request. If a process end request is absent (step S101; No), the flow proceeds to step S102. If a process end request is present (step S101; Yes), a train operation support process ends.

Step S102 is processing performed by the CPU 101 of the train operation support system 100 depicted in FIG. 1, to examine whether or not recreation of a planned timetable is necessary. For example, step S102 determines that recreation of the planned timetable is necessary in a case where a rescheduled timetable in a time range from the current time to a time given beforehand is not created, a case where new transport disorder information is input, or other cases. In a case where recreation of the planned timetable is necessary (step 102; Yes), the flow proceeds to step S103. In a case where recreation of the planned timetable is unnecessary (step 102; No), the flow proceeds to step S101.

Step S103 is processing performed by the CPU 101 of the train operation support system 100 depicted in FIG. 1, to specify points to be improved. For example, step S103 searches information associated with respective trains included in the planned timetable and stored as timetable data depicted in FIG. 2, and saves, in the storage unit 105, train numbers, departure or arrival station names, and arrival times and departure times associated with trains each having a criterion, such as a delay time and congestion, exceeding a given threshold.

Step S104 is processing performed by the CPU 101 of the train operation support system 100 depicted in FIG. 1, to examine presence or absence of points to be improved in the planned timetable. In a case where points to be improved are present in the planned timetable (step 104; Yes), the flow proceeds to step S105. In a case where points to be improved are absent in the planned timetable (step 104; No), the flow proceeds to step S101.

Step S105 is processing performed by the CPU 101 of the train operation support system 100 depicted in FIG. 1, to recreate the planned timetable. Details of processing in step S105 will be described later.

Step S106 is processing performed by the CPU 101 of the train operation support system 100 depicted in FIG. 1, to output a rescheduled timetable. For example, step S106 outputs a rescheduled timetable created in step S105 from the transmission/reception unit 104 to a display of the user terminal 400.

The outline of the process performed by the train operation support system 100 according to the first embodiment of the present invention has been presented above.

Details of the timetable rescheduling process in FIG. 11 will be described hereinafter.

(1.4.2 Details of Processing in Step S105: Timetable Rescheduling Process)

Details of the processing in step S105 will be described with reference to FIG. 12.

(1.4.2.1 Outline)

Figure 12:
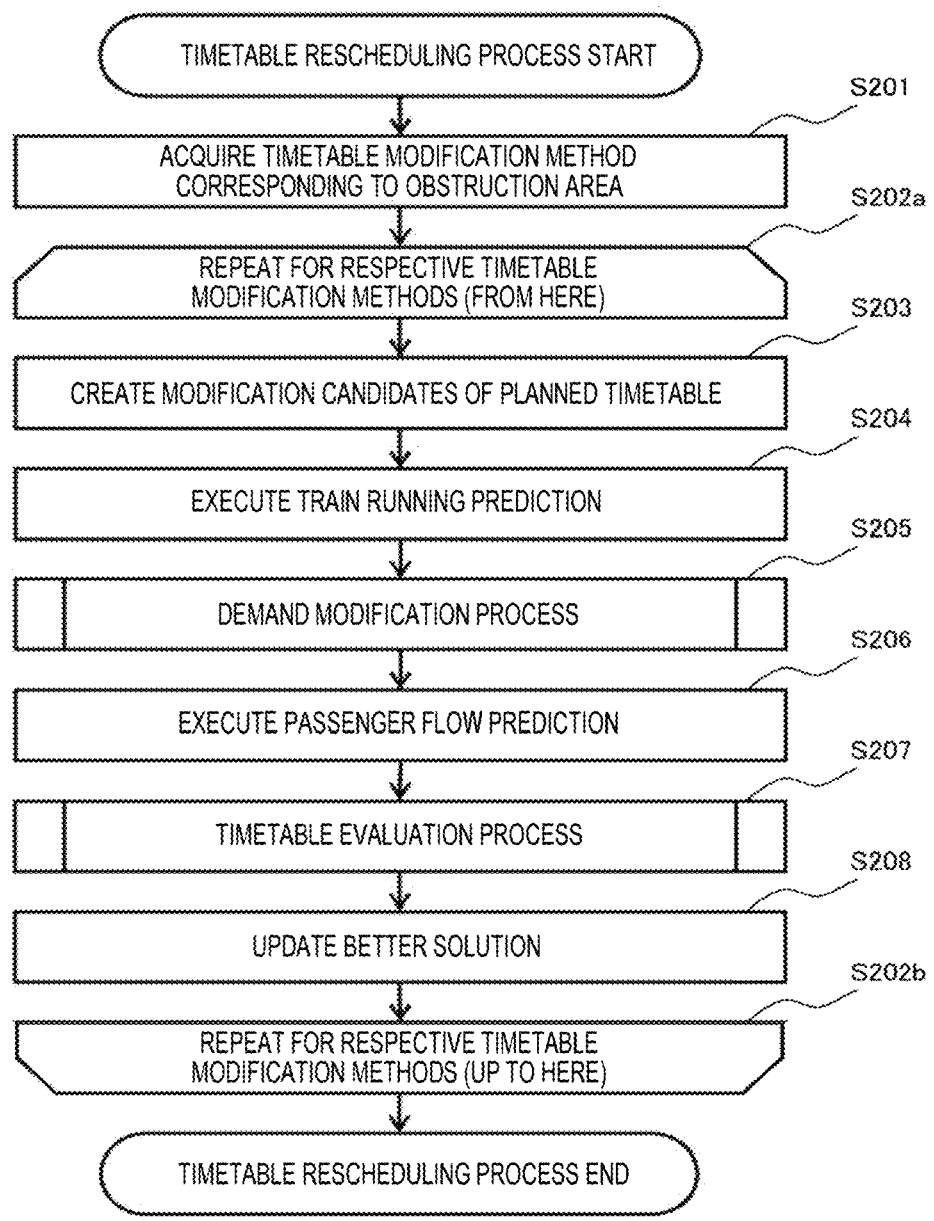
FIG. 12 is a flowchart illustrating details of a timetable rescheduling process according to the first embodiment.

FIG. 12 is a flowchart for explaining details of the timetable rescheduling process performed in step S105 illustrated in FIG. 11.

Step S201 is processing performed by the CPU 101 of the train operation support system 100 depicted in FIG. 1, to acquire a timetable modification method corresponding to an obstruction area determined by transport disorder information. For example, step S201 searches for information indicating agreement between an obstruction area determined by transport disorder information and conditions of an obstruction area defined in modification data, with reference to the modification data stored in the modification database D07, to acquire timetable modification methods as candidates. A process for acquiring the timetable modification methods as candidates from the modification data can be achieved by use of various technologies conventionally known. Accordingly, specific description of this process is omitted here.

Step S202*a* is processing performed by the CPU 101 of the train operation support system 100 depicted in FIG. 1, to repeat processing from step S203 to step S208 the number of times corresponding to the number of timetable modification methods acquired in step S201. Step S202*a* sequentially selects the acquired timetable modification methods in a course of repetitive processing. The repetitive processing associated with step S202*a* is completed when reaching step S202*b*.

Step S203 is processing performed by the CPU 101 of the train operation support system 100 depicted in FIG. 1, to create modification candidates of a planned timetable. For example, step S203 modifies the planned timetable by using the timetable modification method selected in step S202*a*. Modification of the planned timetable by the timetable modification method may be performed with use of a known technology (e.g., WO2020-110487). At this time, a directory path to a program for modifying the planned timetable may be set for the timetable modification method, or modification contents at the time of execution of the program may be defined beforehand as data, for example. Note that the modification candidates of the planned timetable may be created by partially applying modification to a small number of trains in the planned timetable or collectively modifying the planned timetable set to a certain time, according to the program for modifying the planned timetable, or may be created by executing a single program by a plurality of parameters or using a combination of a plurality of programs, for example. Moreover, for example, the timetable modification method may be created based on modification contents practiced in previous rescheduling work.

Step S204 is processing performed by the CPU 101 of the train operation support system 100 depicted in FIG. 1, to execute train running prediction. Train running prediction may be performed by using a known technology (e.g., JP-2011-218838-A).

Step S205 is processing performed by the CPU 101 of the train operation support system 100 depicted in FIG. 1, to modify demands according to the modification contents of the planned timetable. Details of processing in step S205 will be described later.

Step S206 is processing performed by the CPU 101 of the train operation support system 100 depicted in FIG. 1, to execute passenger flow prediction. For example, step S206 executes passenger flow prediction which outputs predicted values of passenger riding information (in the form of the passenger riding data D40) and passenger staying information (in the form of the passenger staying data D50) according to input of demand information (in the form of the demand data D30) modified in step S205. Passenger flow prediction may be performed by using a known technology (e.g., JP-2019-177760-A). As described above, a passenger flow prediction unit (e.g., passenger flow prediction program P04) further calculates passenger riding information (e.g., passenger riding data D40) including information indicating the number of riding passengers at the time of departure of respective trains from respective stations. In addition, as described below, a timetable rescheduling unit (e.g., timetable rescheduling program P01) creates a rescheduled timetable for a planned timetable with use of passenger staying information (e.g., passenger staying data D50) output from the passenger flow prediction unit and the passenger riding information described above. Accordingly, a rescheduled timetable in which passenger flow prediction and passenger staying prediction are taken into consideration can be output.

Step S207 is processing performed by the CPU 101 of the train operation support system 100 depicted in FIG. 1, to evaluate modification candidates of the planned timetable. Details of processing in step S207 will be described later.

Step S208 is processing performed by the CPU 101 of the train operation support system 100 depicted in FIG. 1, to update a better solution. For example, step S208 compares evaluation values of previous better solutions with evaluation values of modification candidates of the planned timetable corresponding to a target, in reference to an evaluation result calculated in step S207, and designates the better evaluation values as a better solution to update the better solution.

Step S202*b* is processing performed by the CPU 101 of the train operation support system 100 depicted in FIG. 1, to return to step S202*a*.

The details of the timetable rescheduling process performed in step S105 according to the first embodiment of the present invention have been presented above.

Details of respective processing in FIG. 12 will be described hereinafter.

(1.4.2.2 Details of Processing in Step S205: Demand Modification Process)

Details of the processing in step S205 will be described with reference to FIG. 13.

(1.4.2.2.1 Outline)

Figure 13:
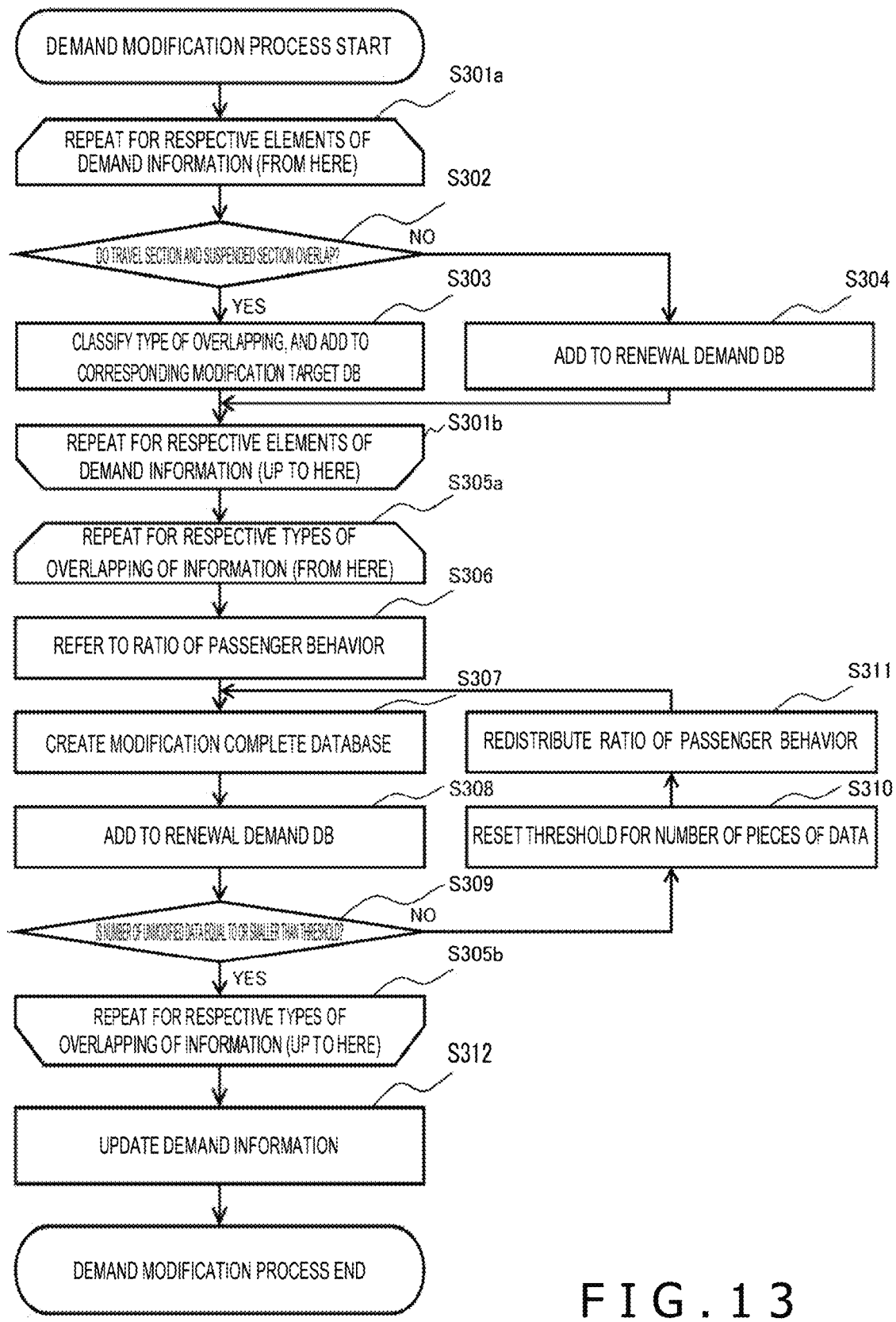
FIG. 13 is a flowchart illustrating details of a demand modification process according to the first embodiment.

FIG. 13 is a flowchart for explaining details of the demand modification process performed in step S205 illustrated in FIG. 12.

Step S301*a* is processing performed by the CPU 101 of the train operation support system 100 depicted in FIG. 1, to repeat processing from step S302 to step S304 the number of times corresponding to the number of elements contained in demand information (duplication of information in the demand data D30). Step S301*a* sequentially selects the respective elements contained in the demand information in a course of repetitive processing (the selected element of the demand information will hereinafter be referred to as a "target demand"). The repetitive processing associated with step S301*a* is completed when reaching step S301*b*.

Step S302 is processing performed by the CPU 101 of the train operation support system 100 depicted in FIG. 1, to examine whether or not a travel section determined by a target demand overlaps with a suspended section determined by a planned timetable. In a case where the travel section and the suspended section overlap with each other (step 302; Yes), the flow proceeds to step S303. In a case where the travel section and the suspended section do not overlap with each other (step 302; No), the flow proceeds to step S304. In addition, in a case where a plurality of suspended sections are present, for example, step S302 may determine overlapping by defining a new suspended section containing the plurality of suspended sections according to a positional relation between the travel section and the suspended sections, or may determine overlapping by selecting one of the suspended sections associated with the travel section. As described above, a timetable rescheduling unit (e.g., timetable rescheduling program P01) in step 302 uses information associated with the suspended section as traffic conditions defined in the passenger model, at the time of modification of the demand information (e.g., demand data D30). Accordingly, new demand information can be determined in consideration of the suspended section in the following processing.

Step S303 is processing performed by the CPU 101 of the train operation support system 100 depicted in FIG. 1, to classify a type of overlapping and add a target demand requiring modification to a corresponding modification target database (DB). For example, step S303 classifies overlapping into types (1) where the travel section contains the suspended section, (2) where the suspended section contains a departure spot of the travel section but does not contain an arrival spot, (3) where the suspended section contains the arrival spot of the travel section but does not contain the departure spot, and (4) where the suspended section contains the travel section, and adds a target demand to a modification target database (DB) (not depicted) corresponding to the classified type. Note that the types of overlapping are not limited to the types described above, and may be set according to the number of stations, a distance, or other factors overlapping between the travel section and the suspended section.

Step S304 is processing performed by the CPU 101 of the train operation support system 100 depicted in FIG. 1, to add a target demand not requiring modification to a renewal demand database (DB). For example, step S304 adds a target demand to the renewal demand database (DB) (not depicted).

Step S301b is processing performed by the CPU 101 of the train operation support system 100 depicted in FIG. 1, to return to step S301a.

Step S305a is processing performed by the CPU 101 of the train operation support system 100 depicted in FIG. 1, to repeat processing from step S306 to step S311 the number of times corresponding to the number of types of overlapping. Step S305a sequentially selects the types of overlapping in a course of repetitive processing (the selected type of overlapping will hereinafter be referred to as a "target type of overlapping"). The repetitive processing associated with step S305a is completed when reaching step S305b.

Step S306 is processing performed by the CPU 101 of the train operation support system 100 depicted in FIG. 1, to refer to a ratio of a passenger behavior. For example, step S306 refers to a ratio of a passenger behavior created beforehand for each target type or time zone. For example, the ratio of the passenger behavior here may be statistically set for the type of the passenger model D60 in reference to surveys totaled beforehand, or may be set using GPS data received from portable terminals, data obtained from a travel route search application, or the like. Moreover, for example, the ratio of a passenger behavior may be adjusted using data obtained from automatic ticket gates or monitoring cameras equipped at stations, infrared devices and load compensating devices mounted on respective trains, and portable terminals carried by respective passengers.

As described above, in step 306, a storage unit (e.g., storage unit 105) which stores statistics including information indicating a ratio associated with a behavior selected by each passenger according to traffic conditions of a train (e.g., the foregoing ratio of a passenger behavior created beforehand for each target type of overlapping or time zone) is further provided. A timetable rescheduling unit (e.g., timetable rescheduling program P01) modifies demand information (e.g., demand data D30) by using a planned timetable modified by a timetable modification unit (e.g., timetable modification program P02) and the foregoing statistics. By performing the processing in step S306, creation of a rescheduled timetable is achievable by estimation of an overall change associated with behaviors of respective passengers even in a case where the behaviors of the respective passengers vary according to traffic conditions.

Step S307 is processing performed by the CPU 101 of the train operation support system 100 depicted in FIG. 1, to create a modification complete database (DB). For example, step S307 executes the following three processes. As described below, in step 307, a storage unit (e.g., storage unit 105) which stores a passenger model (e.g., passenger model D60) indicating travel routes of passengers according to traffic conditions of trains is further provided. A timetable rescheduling unit (e.g., timetable rescheduling program P01) modifies demand information (e.g., demand data D30) by using a planned timetable modified by a timetable modification unit (e.g., timetable modification program P02) and the foregoing passenger model. Accordingly, new demand information for passengers requiring modification can be determined for each characteristic or situation of passengers.

For example, a first process initializes the modification complete database (DB) (not depicted) associated with a target type of overlapping. In this manner, re-addition of a demand already registered in the renewal demand database (DB) to the renewal demand database (DB) is prevented.

For example, a second process creates demands by allocating the passenger model D60 to each element of the modification target database (DB) associated with the target type of overlapping in reference to a ratio of a passenger behavior. For creating the demands here, for example, behavior information which has "waiting time" agreeing with or closest to a waiting time of passengers corresponding to a target demand in modification candidates of a planned timetable is extracted from behavior information which indicates agreement between conditions of "start point of suspended section" and "end point of suspended section" in the passenger model D60 and a suspended section of modification candidates of the planned timetable. In addition, a demand for traveling from a departure station to a first transfer station and a demand for traveling from a second transfer station to an arrival station are created according to a pair of stations set as "transfer station" in the extracted behavior information (in a case where "*" is contained in "transfer station," either one or none of the demand for traveling from the departure station to the first transfer station and the demand for traveling from the second transfer station to the arrival station is created).

At this time, "departure time" of the demand to be created is set using "departure time" of the referenced demand, "travel route time" which is a time required for traveling to the first transfer station within the target railway line by train, and "detour time" determined by behavior information, for example. In addition, "travel route" of the demand to be created is set using "departure station" and "arrival station" of the referenced demand and "transfer station" determined by the behavior information.

Note that the waiting time of passengers corresponding to the target demand may be determined using an unopen time of the suspended section in the modification candidate of the planned timetable, or using a time required until getting on a train that heads toward the arrival station, by using an estimation value of a waiting start time, on an assumption that the estimation value of the waiting start time is an arrival time at "start point of suspended section" in a case of riding on a train that heads toward "start point of suspended section," by using information indicating "departure station" and "departure time" determined by the demand, for example.

Moreover, for creation of demands, for example, only a demand for traveling from a second transfer station to an arrival station may be created in a case where a departure station agrees with a first transfer station, for example. In a case where the number of stations exceeding a predetermined threshold are present between the departure station and the first transfer station in a situation where the first transfer station is located in a direction opposite to a direction toward the arrival station as a relative relation from the departure station, in a case where a departure station is different from a first transfer station (or the first transfer station is not "*") for a type of overlapping where a departure spot of a travel section is contained in a suspended section, or other cases, an exceptional process such as no-creation of demands and duplication of a referenced demand may be performed.

A process associated with creation of demands will be described with reference to FIGS. 4 and 7. For example, in a case where a suspended section continuing for approximately 10 minutes is produced between "St. N" and "St. M" in a target planned timetable, the fifth row of the demand data D30 depicted in FIG. 4 indicates a demand for traveling from "departure station" of "St. Y" to "arrival station" of "St. A" concerning a passenger having "passenger ID" of "51." When the passenger model D60 depicted in FIG. 7 is selected as a passenger behavior, traffic conditions agree with "start point of suspended section" of "St. N," "end point of suspended section" of "St. M," and "waiting time" of "10" in the fifth row. Accordingly, a demand for traveling from "departure station" of "St. Y" to "arrival station" of "St. N" and a demand for traveling from "departure station" of "St. N" to "arrival station" of "St. A" are created using information associated with "transfer station" and "detour time" in the fifth row of the passenger model D60. At this time, "departure time" of "10:00" in the fifth row of the demand data D30 is set for "departure time" of the former demand, for example, while a time obtained by adding a time required for traveling from "St. Y" to "St. N" by train to "departure time" of "10:00" in the fifth row of the demand data D30 is set for "departure time" of the latter demand, for example.

In addition, in a case where a suspended section continuing for approximately 30 minutes is produced between "St. N" and "St. M" in the target planned timetable, traffic conditions agree with the sixth row in the passenger model D60 depicted in FIG. 7. Accordingly, a demand for traveling from "departure station" of "ST. Y" to "arrival station" of "St. O" and a demand for traveling from "departure station" of "St. G" to "arrival station" of "St. A" are created. At this time, "departure time" of "10:00" in the fifth row of the demand data D30 is set for "departure time" of the former demand, for example, while a time calculated by adding a time required for traveling from "St. Y" to "St. O" by train and "detour time" of "20" for detouring along a travel route located out of the target railway line from "St. O" to "St. G" to "departure time" of "10:00" in the fifth row of the demand data D30 is set for "departure time" of the latter demand, for example. At this time, "departure time" of "10:00" in the fifth row of the demand data D30 is set for "departure time" of the demand to be created, for example.

In addition, in a case where a suspended section continuing for approximately 60 minutes is produced between "St. O" and "St. M" in the target planned timetable, traffic conditions agree with the seventh row in the passenger model D60 depicted in FIG. 7. Accordingly, only a demand for traveling from "departure station" of "St. Y" to "arrival station" of "St. O" is created, and a demand for traveling to the arrival station as an initial goal is eliminated.

For example, a third process adds created demands to the modification complete database (DB) associated with the target type of overlapping, and deletes the demands referenced during creation of the added demands from the modification target database (DB) associated with the target type of overlapping. In addition, in a case where the number of stations exceeding a predetermined threshold are present between a departure station and a first transfer station in a situation where the first transfer station is located in a direction opposite to a direction toward an arrival station as a relative relation from the departure station, in a case where a departure station is different from a first transfer station (or the first transfer station is not "*") for a type of overlapping where a departure spot of a travel section is contained in a suspended section, or other cases, demands referenced when creation of demands is not practiced need not be deleted from the modification target database (DB).

Step S308 is processing performed by the CPU 101 of the train operation support system 100 depicted in FIG. 1, to add data stored in the modification complete database (DB) to a renewal demand database (DB). For example, step S308 acquires data stored in the modification complete database (DB) associated with the target type of overlapping, and adds the acquired data to the renewal demand database (DB).

Step S309 is processing performed by the CPU 101 of the train operation support system 100 depicted in FIG. 1, to examine whether or not the number of pieces of data unmodified and left in the modification target database (DB) associated with the target type of overlapping is equal to or smaller than a threshold. In a case where the number of pieces of data is equal to or smaller than a threshold (step 309; Yes), the flow proceeds to step 305b. In a case where the number of pieces of data is not equal to or smaller than the threshold (step 309; No), the flow proceeds to step 310.

Step S310 is processing performed by the CPU 101 of the train operation support system 100 depicted in FIG. 1, to reset the threshold associated with the number of pieces of unmodified data. For example, step S310 resets the threshold of the number of pieces of unmodified data to a number for easing the limit. Note that the threshold need not be reset or may be reset by changing the value for easing the limit according to the number of times of execution of step S310, for example.

Step S311 is processing performed by the CPU 101 of the train operation support system 100 depicted in FIG. 1, to redistribute a ratio of a passenger behavior. For example, step S311 calculates a ratio of the actual number of successes in creation of demands concerning types of the passenger model D60, and redistributes the ratio of the passenger behavior to achieve the ratio of the passenger behavior referenced in step S306 to a maximum extent, according to the number of pieces of data left in the modification target database (DB) associated with the target type of overlapping. Note that the ratio need not be redistributed, or may be redistributed by changing the value of distribution according to the number of times of execution of step S311, for example.

Step S305b is processing performed by the CPU 101 of the train operation support system 100 depicted in FIG. 1, to return to step S305a.

Step S312 is processing performed by the CPU 101 of the train operation support system 100 depicted in FIG. 1, to update demand information. For example, step S312 updates the demand information by duplicating demands stored in the renewal demand database (DB).

In addition, in a case where transfer from a station within a target railway line to the outside of the target railway line occurs a plurality of times, for example, the demand modification process may sequentially process a plurality of pairs of transfer stations defined in the passenger model D60 and modify demands. For example, in a case where two pairs of transfer stations are defined, a demand for traveling from a departure station to a first transfer station (a first element of a pair of first transfer stations), a demand for traveling from a second transfer station (a second element of the pair of the first transfer stations) to a third transfer station (a first element of a pair of second transfer stations), and a demand for traveling from a fourth transfer station (a second element of the pair of the second transfer stations) to an arrival station are created.

(1.4.2.3 Details of Processing in Step S207: Timetable Evaluation Process)

Details of the processing in step S207 will be described with reference to FIG. 14.

(1.4.2.3.1 Outline)

Figure 14:
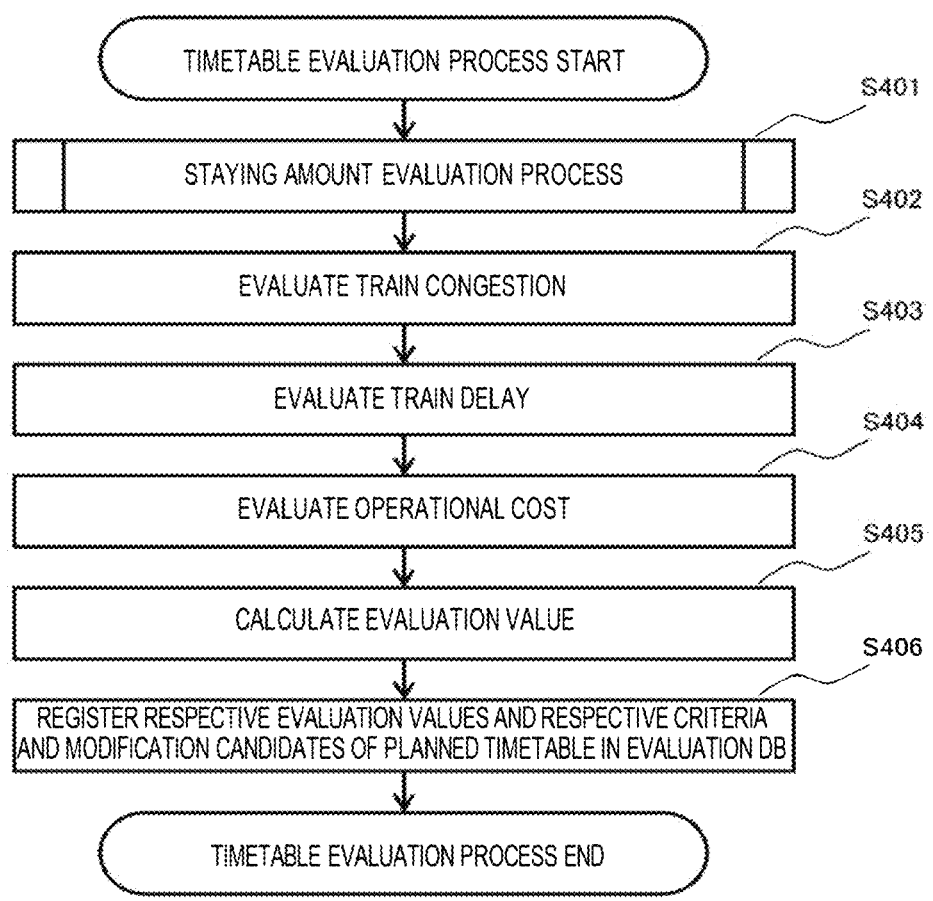
FIG. 14 is a flowchart illustrating details of a timetable evaluation process according to the first embodiment.

FIG. 14 is a flowchart for explaining details of the timetable evaluation process performed in step S207 illustrated in FIG. 12.

Step S401 is processing performed by the CPU 101 of the train operation support system 100 depicted in FIG. 1, to evaluate a staying amount of passengers at each station for modification candidates of a planned timetable. Details of processing in step S401 will be described later.

Step S402 is processing performed by the CPU 101 of the train operation support system 100 depicted in FIG. 1, to evaluate congestion of each train for the modification candidates of the planned timetable. For example, step S402 acquires the number of riding passengers at the time of departure of each train from each station in reference to passenger riding information predicted in step S206 for the modification candidates of the planned timetable, and calculates the number of passengers in excess of the number of riding passengers by which the train is determined to be congested and the number of passengers short of the number of riding passengers by which the train is determined to be empty, to designate an amount obtained by weighting these numbers and summing up the weighted numbers as an evaluation value. Note that the evaluation value for congestion of each train may be calculated by using a ratio obtained by dividing the number of passengers by the maximum capacity, the number of passengers in excess of the maximum capacity of the train, or the like, or may be calculated by changing a weighted value for each train or station, to set a degree of importance for a particular train or station, or limit a train or a station corresponding to an evaluation target, for example.

Step S403 is processing performed by the CPU 101 of the train operation support system 100 depicted in FIG. 1 to evaluate delay time of each train for the modification candidates of the planned timetable. For example, step S403 compares planned timetable information planned beforehand with predicted timetable information predicted in step S204, with respect to timetable information (in the form of timetable data D10), to calculate delay time during departure and arrival of each train at each station, and designate a total value of the calculated delay time as an evaluation value. Note that the evaluation value for delay time of each train may be calculated using the number of trains and delay time in a case where delay time of each train exceeds a predetermined threshold, the number of trains not operated (cancelled) in reference to the planned timetable information, or the like, or may be calculated by changing a weighted value for each train or station to set a degree of importance for a particular train, station, or arrival/departure information, limit a train, a station, or arrival/departure information corresponding to an evaluation target, for example.

Step S404 is processing performed by the CPU 101 of the train operation support system 100 depicted in FIG. 1, to evaluate each operational cost for the modification candidates of the planned timetable. For example, step S404 calculates a running distance, power consumption, or the like for each operation by using timetable information (in the form of the timetable data D10) and operation information (in the form of the operation data D20), and weights costs of these to designate a total amount as an evaluation value. Calculation of the running distance and the power consumption may be achieved either by using definition data beforehand, or by utilizing a simulator. Note that the evaluation value for the operational cost may be calculated by adding appropriate data or simulators and using the number of cars to be used, a difference from operation information planned beforehand, influence on maintenance work (e.g., a modification amount of a daily total running distance, a modification amount of the number of inspections, steps, time, or personnel), or the like, or may be calculated by changing a weighted value for each operation to set a degree of importance for particular operation or limit operation corresponding to an evaluation target, for example.

Step S405 is processing performed by the CPU 101 of the train operation support system 100 depicted in FIG. 1, to calculate an evaluation value for each of the modification candidates of the planned timetable. For example, step S405 designates a total amount obtained by weighting respective evaluation values calculated from step S401 to step S404 as an overall evaluation value for the corresponding modification candidate of the planned timetable.

Step S406 is processing performed by the CPU 101 of the train operation support system 100 depicted in FIG. 1, to register respective evaluation values calculated from step S401 to step S405, respective criteria, and the modification candidates of the planned timetable in the evaluation database D09. For example, step S405 associates, with each of the modification candidates of the target planned timetable, an evaluation value of a staying amount of a station, congestion of a train, delay time of a train, operational cost, or the like, the number of staying passengers, density, and the maximum number of staying passengers at each station, the number of riding passengers and congestion when each train departs from each station and the number of riding passengers in excess of a threshold or a maximum capacity, delay time at the time of departure and arrival of each train at each station and the number of cancelled trains, and such criteria as a running distance and power consumption of each operation, and registers these items associated with the modification candidates in the evaluation database D09. Note that the evaluation values and the criteria are not limited to the foregoing examples. Quantities calculated in each evaluation process within the timetable evaluation process may be associated with the modification candidates of the target planned timetable and registered in the evaluation database D09.

The outline of the processing performed in step S207 according to the first embodiment of the present invention has been presented above. Details of the staying amount evaluation process in FIG. 14 will be described hereinafter.

(1.4.2.4 Details of Processing in Step S401: Staying Amount Evaluation Process)

Details of the processing in step S401 will be described with reference to FIG. 15. As presented below, a timetable rescheduling unit (e.g., timetable rescheduling program P01) estimates a staying amount including either one of or both the number of staying passengers indicating the number of passengers staying in each time zone at each station and density indicating a level of congestion of passengers staying in each time zone at each station, for a planned timetable modified by a timetable modification unit (e.g., timetable modification program P02), by using passenger staying information (e.g., passenger staying data D50) output from a passenger flow prediction unit (e.g., passenger flow prediction program P04), and calculates an evaluation value associated with this staying amount, to create a rescheduled timetable for the planned timetable by using this staying amount. Accordingly, creation of a rescheduled timetable for a planned timetable is achievable in consideration of a specific staying amount of passengers.

(1.4.2.4.1 Outline)

Figure 15:
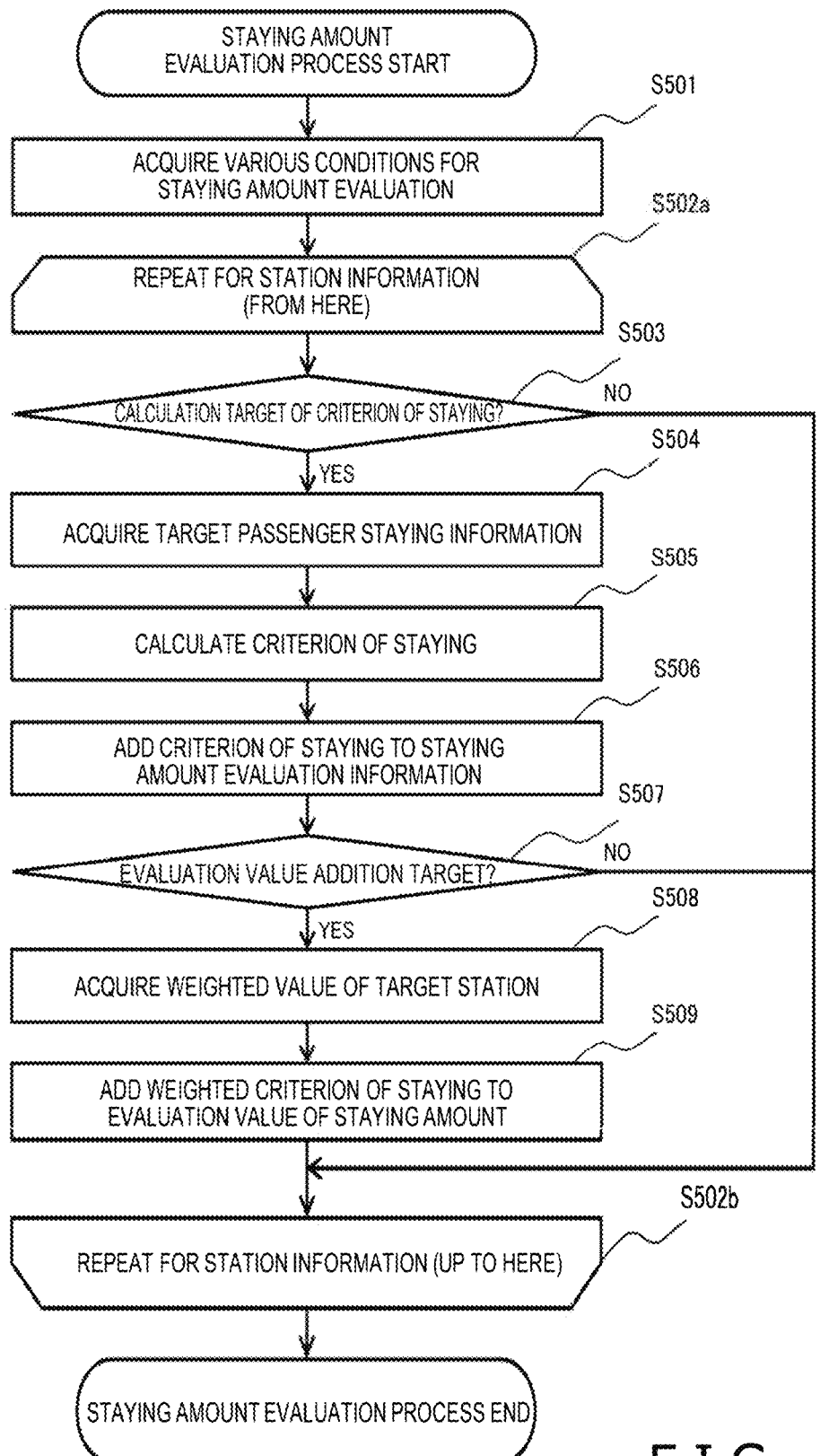
FIG. 15 is a flowchart illustrating details of a staying amount evaluation process according to the first embodiment.

FIG. 15 is a flowchart for explaining details of the staying amount evaluation process performed in step S401 illustrated in FIG. 14.

Step S501 is processing performed by the CPU 101 of the train operation support system 100 depicted in FIG. 1, to acquire various conditions for staying amount evaluation. For example, step S501 acquires conditions of a station corresponding to a target of criterion calculation and evaluation value addition, weighted values for respective stations, a time interval of staying amount evaluation, a type of criterion, and the like with reference to predetermined parameters.

Step S502a is processing performed by the CPU 101 of the train operation support system 100 depicted in FIG. 1, to repeat processing from step S503 to step S509 the number of times corresponding to the number of stations contained in a target railway line. Step S502a sequentially selects the stations contained in the target railway line (hereinafter the selected station will be referred to as a "target station") in a course of repetitive processing, with reference to the passenger riding data D40. The repetitive processing associated with step S502a is completed when reaching step S502b.

Step S503 is processing performed by the CPU 101 of the train operation support system 100 depicted in FIG. 1, to examine whether or not the target station is a calculation target of a criterion of staying. In a case where the target station is the calculation target (step 503; Yes), the flow proceeds to step S504. In a case where the target station is not the calculation target (step 503; No), the flow proceeds to step S502b.

Step S504 is processing performed by the CPU 101 of the train operation support system 100 depicted in FIG. 1, to acquire passenger staying information (in the form of the passenger staying data D50) associated with the target station. For example, step S504 acquires all pieces of information indicating "station" agreeing with the target station, with reference to the predicted value of the passenger staying information predicted in step S206. Note that the passenger staying information to be acquired may be information from which information not contained in the time interval of the staying amount evaluation is eliminated, for example.

Step S505 is processing performed by the CPU 101 of the train operation support system 100 depicted in FIG. 1, to calculate a criterion of staying. For example, step S505 calculates an average of the number of staying passengers, density, the maximum number of staying passengers, or the like in a target time interval at a target station, as the criterion of staying, by using the passenger staying information acquired in step S504. Note that the criterion of staying is not limited to the foregoing examples. For example, the criterion of staying may be calculated based on calculation of dispersion of the staying amount or a time rate of change of the staying amount, or may be calculated using a typical value in the target time interval (e.g., maximum value, minimum value, median), a weighted average of respective weighted data, a value in excess of (or short of) a predetermined threshold, or the like. Moreover, for example, step S505 may match a range of a time interval of staying amount evaluation with a time unit of totaling of the passenger flow information, to uniquely determine the value of the criterion of staying for the passenger flow information.

Step S506 is processing performed by the CPU 101 of the train operation support system 100 depicted in FIG. 1, to add the calculated criterion of staying to staying amount evaluation information (in the form of the staying amount evaluation data D80). For example, step S506 adds the respective criteria of staying calculated in step S505 to the criterion of staying.

Step S507 is processing performed by the CPU 101 of the train operation support system 100 depicted in FIG. 1, to examine whether or not the target station is an evaluation value addition target. In a case where the target station is the addition target (step 507; Yes), the flow proceeds to step S508. In a case where the target station is not the addition target (step 507; No), the flow proceeds to step S502b.

Whether or not the target station is the addition target of the evaluation value is determined beforehand. For example, in a case where the target station is a station into which a plurality of railway lines enter, the target station is an important station in the planned timetable. Accordingly, this target station may be determined as the addition target of the evaluation value.

Step S508 is processing performed by the CPU 101 of the train operation support system 100 depicted in FIG. 1, to acquire a weighted value of the target station. For example, step S508 acquires a weighted value associated with the target station from the weighted values associated with the respective stations and acquired in step S501.

Step S509 is processing performed by the CPU 101 of the train operation support system 100 depicted in FIG. 1, to add the weighted criterion of staying to an evaluation value of a staying amount. For example, step S509 multiplies the weighted value acquired in step S508 for an item of the addition target of the evaluation value included in the criterion of staying calculated in step S505, and adds the weighted item to the evaluation value of the staying amount. Note that the evaluation value for the staying amount of the station may be calculated using the number of staying passengers in excess of (or short of) a predetermined threshold, density, the maximum number of staying passengers, dispersion of the staying amount, a time rate of change of the staying amount, or the like, or may be calculated by changing the weighted value for each station to set a degree of importance for a specific station, or limit the station corresponding to the evaluation target, for example.

As described above, a timetable rescheduling unit (e.g., timetable rescheduling program P01) calculates the evaluation value associated with the staying amount by using weighted values set for respective stations, or calculates the evaluation value associated with the staying amount by using either one of or both the staying amount larger than a predetermined threshold or the staying amount smaller than the predetermined threshold. Accordingly, the evaluation value can be calculated for the target station and the staying amount in various situations.

Step S502b is processing performed by the CPU 101 of the train operation support system 100 depicted in FIG. 1, to return to step S502a.

(1.5 Train Operation Support Information Presented to User)

Train operation support information presented to a user will be described with reference to FIG. 16. For example, the train operation support information is displayed on the display of the user terminal 400 under the timetable rescheduling program P01 executed by the CPU 101 of the train operation support system 100. As described below, a storage unit (e.g., storage unit 105) which stores either one of or both passenger flow information containing information (e.g., staying amount evaluation data D80) associated with a staying amount of passengers for a rescheduled timetable of the planned timetable and timetable modification log information (e.g., timetable modification log data D70) containing information indicating modification practiced when the rescheduled timetable is created is further provided, and outputs either one of or both the passenger flow information and the timetable modification log information together with the rescheduled timetable. Accordingly, the user is capable of easily recognizing these items of information on the basis of which the rescheduled timetable is created, together with the rescheduled timetable.

(1.5.1 Outline of Train Operation Support Information)

Figure 16:
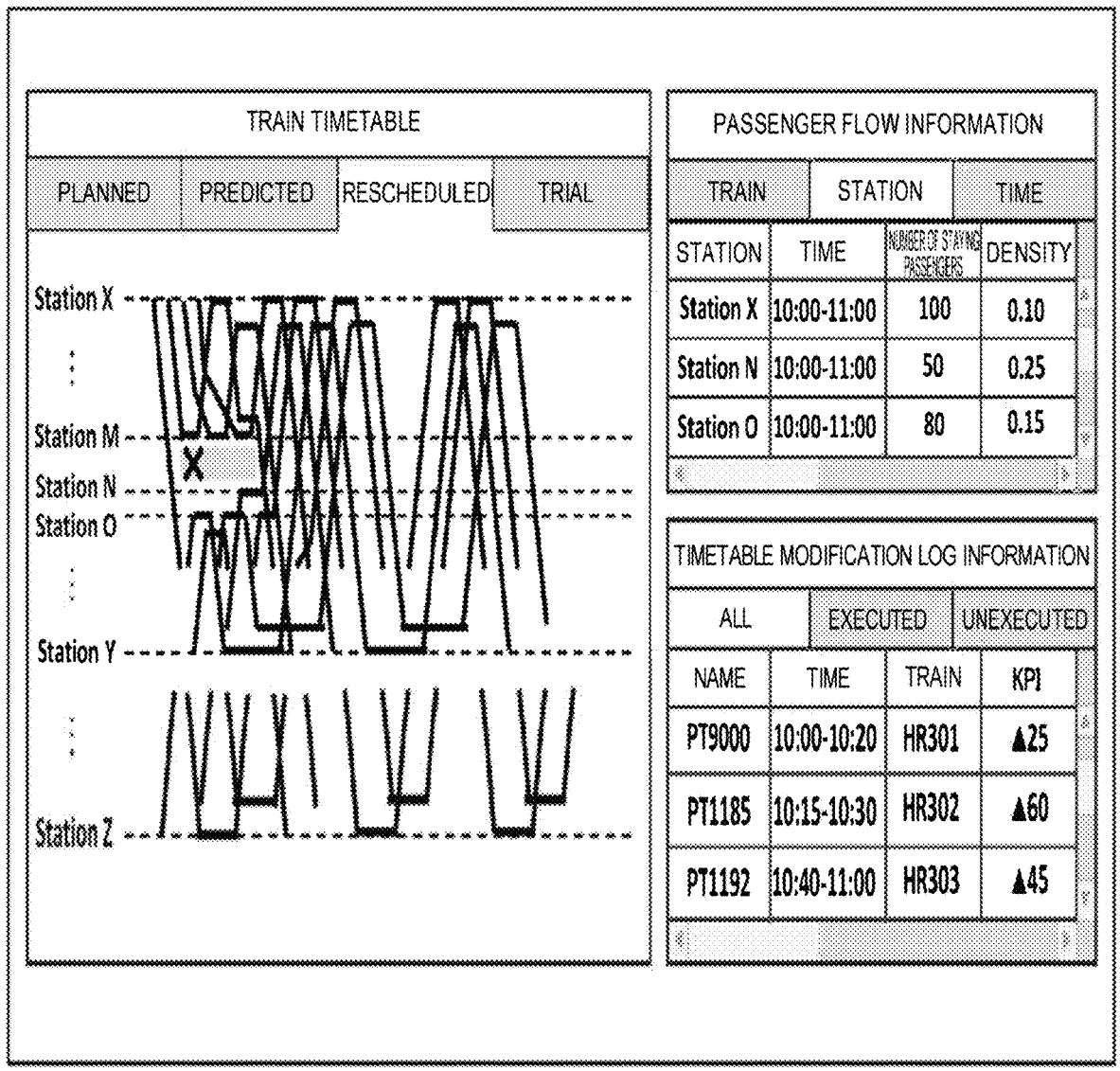
FIG. 16 is a chart illustrating an example of a screen presented to a user according to the first embodiment.

FIG. 16 is an example of the train operation support information presented to the user.

The train operation support information depicted in FIG. 16 and presented to the user includes "train timetable," "passenger flow information," and "timetable modification log information." Note that the train operation support information presented to the user is not limited to the example described above, and may include "train operation information" indicating traffic conditions of trains, "operational cost information" indicating operational cost, or the like.

(1.5.2 Display of Train Timetable)

For example, displayed in "train timetable" in FIG. 16 is a planned timetable which has a vertical axis representing each station and a horizontal axis representing time. Display of the planned timetable in "train timetable" switches according to selection of such a tab as "planned," "predicted," "rescheduled," and "trial."

For example, "planned" is a tab for displaying a planned timetable determined beforehand. For example, information contained in the planned timetable data D01 is drawn in "planned."

For example, "predicted" is a tab for displaying a predicted result associated with future train operation in reference to an actual timetable or transport disorder information. For example, a predicted result at the time of execution of the train running prediction program P03 or the passenger flow prediction program P04 for a planned timetable not yet modified is drawn in "predicted."

For example, "rescheduled" is a tab for displaying a rescheduled timetable created by the train operation support system 100. For example, a rescheduled timetable extracted as a better solution by the timetable rescheduling program P01 is drawn in "rescheduled."

For example, "trial" is a tab for displaying a planned timetable during trial of recreation by the train operation support system 100. For example, a planned timetable updated as a better solution during processing by the timetable rescheduling program P01 is drawn in "trial."

For example, in display contents of "rescheduled" depicted in FIG. 16, respective line segments represent running of trains from "Station X" to "Station M," "Station Y," and "Station Z," running of trains from "Station Y" and "Station Z" to "Station 0," "Station N," and "Station X," and the like. Moreover, drawn in display contents of "rescheduled" depicted in FIG. 16 is a planned timetable in a case where train turnback is carried out by the timetable rescheduling program P01 at the time of transport disorder caused at a point with an "x mark."

Note that each line segment indicating running of a train may be colored according to the number of riding passengers or congestion of the corresponding train, and that the horizontal axis representing a position of each station may be colored according to a staying amount of the corresponding station in each time zone.

(1.5.3 Presentation of Passenger Flow Information)

For example, information associated with a passenger flow for a rescheduled timetable is displayed in "passenger flow information" in FIG. 16. Display of the information associated with the passenger flow in "passenger flow information" switches according to selection of such a tab as "train," "station," and "time."

For example, "train" is a tab for displaying congestion, the number of riding passengers, or the like of each train. For example, the number of riding passengers, congestion, or the like associated with each train and stored in the evaluation database D09 is displayed in "train." Note that displayed in "train" are not limited to the foregoing examples, and may be the number of passengers in excess of the maximum capacity of the train, the number of passengers in excess of the number of riding passengers determined to cause congestion of the train, the number of passengers short of the number of riding passengers determined to cause emptiness of the train, or the like, for example.

For example, "station" is a tab for displaying a staying amount of each station. For example, the number of staying passengers, density, the maximum number of staying passengers, or the like associated with each station and stored in the evaluation database D09 is displayed in "station." Note that displayed in "station" are not limited to the foregoing examples, and may be dispersion of a staying amount, a time rate of change of a staying amount, or the like, for example.

For example, "time" is a tab for displaying passengers present within a target railway line at each time. For example, displayed in "time" is a total value of the number of riding passengers and the number of staying passengers in a certain unit of time, calculated using operation information, passenger riding information, and passenger staying information. Note that displayed in "time" is not limited to the foregoing example, and may be a total value of only the number of riding passengers or only the number of staying passengers in a certain unit of time.

Note that displayed in "passenger flow information" are not limited to the above examples, and may be passenger riding information, passenger staying information, or the like, for example.

For example, display contents of "station" depicted in FIG. 16 are constituted by "station," "time," "number of staying passengers," and "density" in reference to information included in the staying amount evaluation data D80.

A station name for individually identifying each station is displayed in "station." For example, FIG. 16 depicts display associated with "station" of "St. X," "St. N," and "St. O."

A time corresponding to a calculation range of a criterion of staying is displayed in "time." For example, items associated with "time" of "10:00-11:00" are displayed in the first to third rows in FIG. 16.

The number of passengers staying within the corresponding time at the corresponding station is specified in "number of staying passengers." For example, items associated with "number of staying passengers" of "100" are displayed in the first row in FIG. 16, while items associated with "number of staying passengers" of "50" are displayed in the second row in FIG. 16. In addition, in "number of staying passengers," a total number or an average number of passengers corresponding to a calculation unit of the number of passengers staying within the corresponding time at the corresponding station, the number of passengers in an individual time unit, or the like may be displayed, or stations where respective passengers stay may be individually calculated for each passenger to avoid duplicated calculation of an identical passenger, for example.

A value indicating a level of congestion of passengers staying within the corresponding time at the corresponding station is displayed in "density." For example, items associated with "density" of "0.10" are displayed in the first row in FIG. 16, while items associated with "density" of "0.25" are displayed in the second row in FIG. 16. In addition, displayed in "density" may be the number of staying passengers per unit area at the corresponding station, the number of staying passengers per unit volume in a three-dimensional space at the corresponding station, or the like, or a ratio of the number of staying passengers to the maximum capacity of the corresponding station, a target value set beforehand, or the like, for example.

Note that such information as a train, a station, a time, the number of passengers, and a criterion desired to be referenced may be narrowed by designation of a search query and displayed in "passenger flow information" in FIG. 16, or that information associated with a target may be displayed by clicking or dragging and dropping a train or a station desired to be referenced from a display part of "train timetable." Moreover, only information associated with a specific train, a specific station, a specific time, a specific number of passengers, a specific criterion, or the like may be displayed by defining display information as data beforehand.

(1.5.4 Presentation of Timetable Modification Log Information)

For example, information associated with a timetable modification log used at the time of creation of a rescheduled timetable is displayed in "timetable modification log information" in FIG. 16. For example, information associated with the timetable modification log in "timetable modification log information" switches according to selection of such a tab as "all," "executed," and "unexecuted."

For example, "all" is a tab for displaying all modifications practiced at the time of creation of the rescheduled timetable. For example, displayed in "all" is information that is included in the timetable modification log data D70 and that corresponds to a rescheduled timetable stored in the modification database D07.

For example, "executed" is a tab for displaying an executed modification among the modifications practiced at the time of creation of the rescheduled timetable. For example, displayed in "executed" is information already executed by the timetable finalization program P06 among the pieces of information that are included in the timetable modification log data D70 and that correspond to the rescheduled timetable stored in the modification database D07.

For example, "unexecuted" is a tab for displaying an unexecuted modification among the modifications practiced at the time of creation of the rescheduled timetable. For example, displayed in "unexecuted" is information not yet executed by the timetable finalization program P06 among the pieces of information that are included in the timetable modification log data D70 and that correspond to the rescheduled timetable stored in the modification database D07.

For example, display contents of "all" depicted in FIG. 16 include "timetable modification method," "time," "train," and "KPI" in reference to information included in the timetable modification log data D70.

A name of a timetable modification method practiced in recreation of a planned timetable is displayed in "timetable modification method." For example, FIG. 8 depicts display of items associated with "timetable modification method" of "PT9000," "PT1185," and "PT1192."

A time when the timetable modification method is practiced in the planned timetable is displayed in "time." For example, items associated with "time" of "10:00-10:20" are displayed in the first row in FIG. 16, while items associated with "time" of "10:15-10:30" are displayed in the second row in FIG. 16.

A train involved in the modification by the corresponding timetable modification method is displayed in "train." For example, items associated with "train" of "HR301" are displayed in the first row in FIG. 16, while items associated with "train" of "HR302" are displayed in the second row in FIG. 16. In addition, in a case where a plurality of trains involved in the modification are present, for example, displayed in "train" may be the plurality of trains collectively displayed in a list form, a dictionary form, or the like, or the train as a reference for modification, the train running at an earliest running time, or the like as a typical train.

A variation of an evaluation value produced by the corresponding timetable modification method is displayed in "KPI." For example, items associated with "KPI" of "125" are displayed in the first row in FIG. 16, while items associated with "KPI" of "160" are displayed in the second row in FIG. 16 (the symbol "1" represents a minus numerical value, such as "−25" and "−60").

Note that such information as a timetable modification method, a time, a train, and a criterion desired to be referenced may be narrowed by designation of a search query, and displayed in "timetable modification log information" in FIG. 16, for example. Moreover, a timetable modification method selected on a screen may be executed by the timetable finalization program P06.

According to the first embodiment of the present invention, as described above, demands of passengers are modified according to modification contents of a planned timetable, a staying amount of passengers at each station is estimated using the modified demands, and a best rescheduled timetable is extracted. In this manner, a rescheduled timetable obtained by adjusting a staying amount of passengers predicted at each station to a preferable value can be presented. Specifically, the train operation support system 100 for outputting a rescheduled timetable for a planned timetable of a train from a computer (e.g., CPU 101) by using the planned timetable and an actual timetable of the train includes a timetable modification unit (e.g., timetable modification program P02) that modifies the planned timetable by using a given timetable modification method, a passenger flow prediction unit (e.g., passenger flow prediction program P04) that calculates passenger staying information containing information (e.g., passenger staying data D50) indicating the number of staying passengers in each time zone at each station by using demand information (e.g., demand data D30) indicating a destination of a passenger in each time zone at each station where the train stops, a timetable rescheduling unit (e.g., timetable rescheduling program P01) that modifies the demand information in reference to the planned timetable modified by the timetable modification unit, inputs the modified demand information to the passenger flow prediction unit, and creates the rescheduled timetable for the planned timetable by using the passenger staying information output from the passenger flow prediction unit, and an output unit (e.g., timetable rescheduling program P01) that outputs the rescheduled timetable created by the timetable rescheduling unit. Accordingly, a rescheduled timetable obtained after adjustment of a staying amount as described above can be presented to the user.

(1.6 Modifications)

While the first embodiment of the present invention has been described above, the embodiment of the present invention is not limited to the presented example, and may be modified in various manners without departing from the subject matters of the invention.

According to the embodiment described above, created is such a rescheduled timetable for a situation where transport disorder has been caused (disruption management). However, the present embodiment is not limited to this example. For example, a rescheduled timetable for on-demand operation, operation at the time of an event schedule (operation when a sporting event, an exhibition, or the like is held), or other occasions may be created in the present embodiment. For example, the rescheduled timetable here can be created by extracting a best reschedule in reference to a result obtained by modifying demands of passengers according to modification contents of a planned timetable modified according to predicted demands and estimating a staying amount of passengers at each station obtained by using the modified demands. In this manner, a rescheduled timetable created by adjusting a predicted staying amount of passengers at each station to a preferable value can similarly be presented in a case where rescheduling work is performed to handle a change of demands of passengers, for example.

Moreover, according to the embodiment described above, a rescheduled timetable for avoiding staying of passengers at each station is created. However, the present embodiment is not limited to this example. For example, a rescheduled timetable may be so created as to guide staying of passengers to a certain specific station. For example, the rescheduled timetable for guiding staying may be created by adjusting a weighted value used at the time of evaluation of staying at each station. In this manner, staying of passengers can be guided to a station to which the staying is desired to be shifted, such as a large-scale station and a station having excellent facilities, for example.

Further, according to the embodiment described above, the timetable evaluation process in step S207 is configured to evaluate a result of train running prediction for the modification candidates of the planned timetable to increase accuracy of the process. However, the configuration of the present invention is not limited to this example. For example, the process may be configured to directly evaluate the modification candidates of the planned timetable created in step S203. In a case where a result of train running prediction is difficult to obtain, it is preferable to adopt this configuration.

Embodiment 2

A second embodiment of the present invention will next be described.

The types of the passenger model D60 may be allocated to respective passengers beforehand in the demand data D30 in the first embodiment to individually modify demands according to characteristics of respective passengers. The second embodiment of the present invention will hereinafter be described in detail with reference to FIGS. 17 and 18.
(2.1 Data Structure)
(2.1.1 Structure of Demand Data)

An example of a data structure of demand data D90 will be described with reference to FIG. 17.

The structure of "passenger ID," "departure station," "arrival station," "departure time," and "travel route" contained in the demand data D90 is similar to the corresponding structure in the first embodiment.

Figure 17:
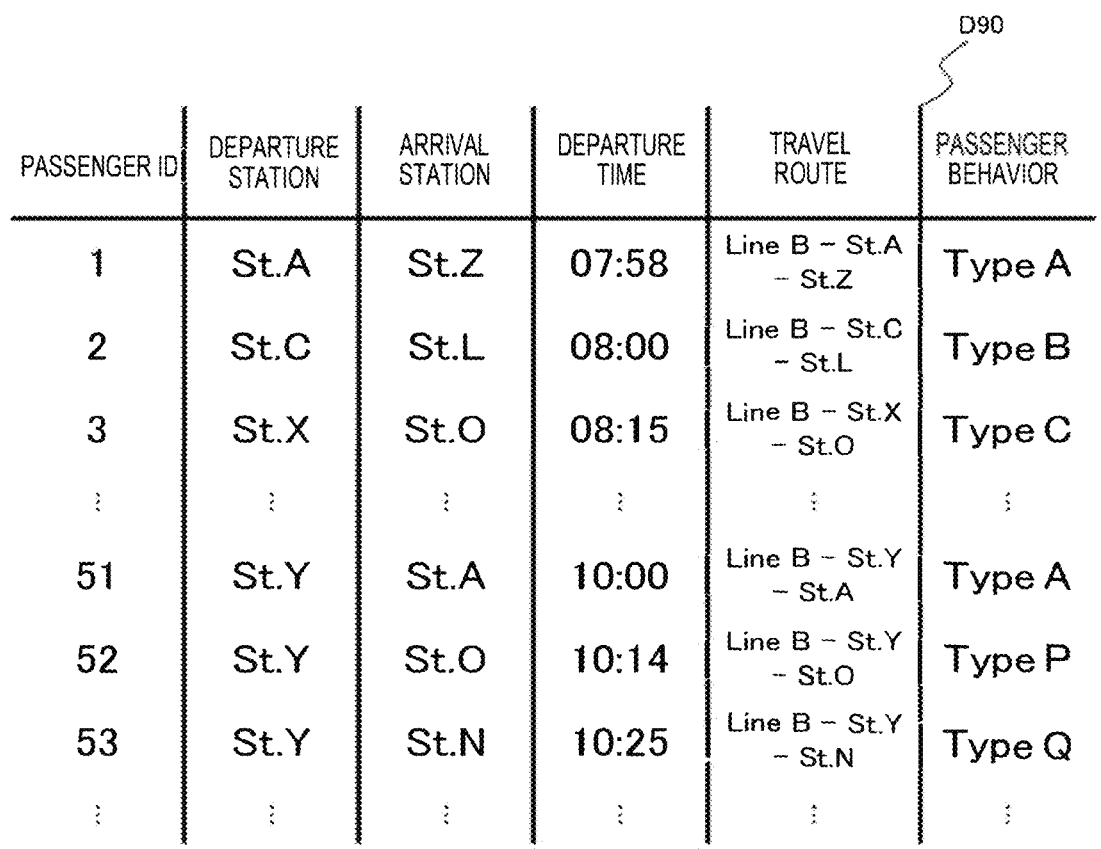
FIG. 17 is a chart illustrating an example of demand data according to a second embodiment.

A type of a passenger model is specified in "passenger behavior." For example, items associated with "passenger behavior" of "Type A" are described in the first row in FIG. 17, while items associated with "passenger behavior" of "Type B" are described in the second row in FIG. 17.

An example of the demand data D90 will be described with reference to FIG. 17. For example, the first row in FIG. 17 indicates that a passenger having "passenger ID" of "1" travels from "departure station" of "ST. A" to "arrival station" of "St. Z" at "departure time" of "07:58" along "travel route" of "Line B-St. A-St. Z" according to a characteristic of "passenger behavior" of "Type A." FIG. 17 includes omitted parts indicated by ellipsis points. In practice, however, there are at least the same number of rows as the number of passengers.

Note that the demand data D30 may collectively define data regarding passengers each having the same "departure station," "arrival station," "departure time," "travel route," and "passenger behavior." At this time, the demand data D90 has data regarding "trip no." instead of "passenger ID," and has new data regarding "number of passengers" to define identical demands, for example. In this manner, collective processing of identical demands is achievable. Accordingly, processing speed associated with calculation of demands is allowed to increase. In other words, processing associated with calculation of demands can efficiently be executed by collectively using pieces of data regarding passengers performing an identical behavior.
(2.2 Processing by Train Operation Support System)
(2.2.1 Details of Processing in Step S105: Timetable Rescheduling Process)
(2.2.1.1 Details of Processing in Step S205: Demand Modification Process)

Details of the processing in step S205 will be described with reference to FIG. 18.
(2.2.1.1.1 Outline)

Figure 18:
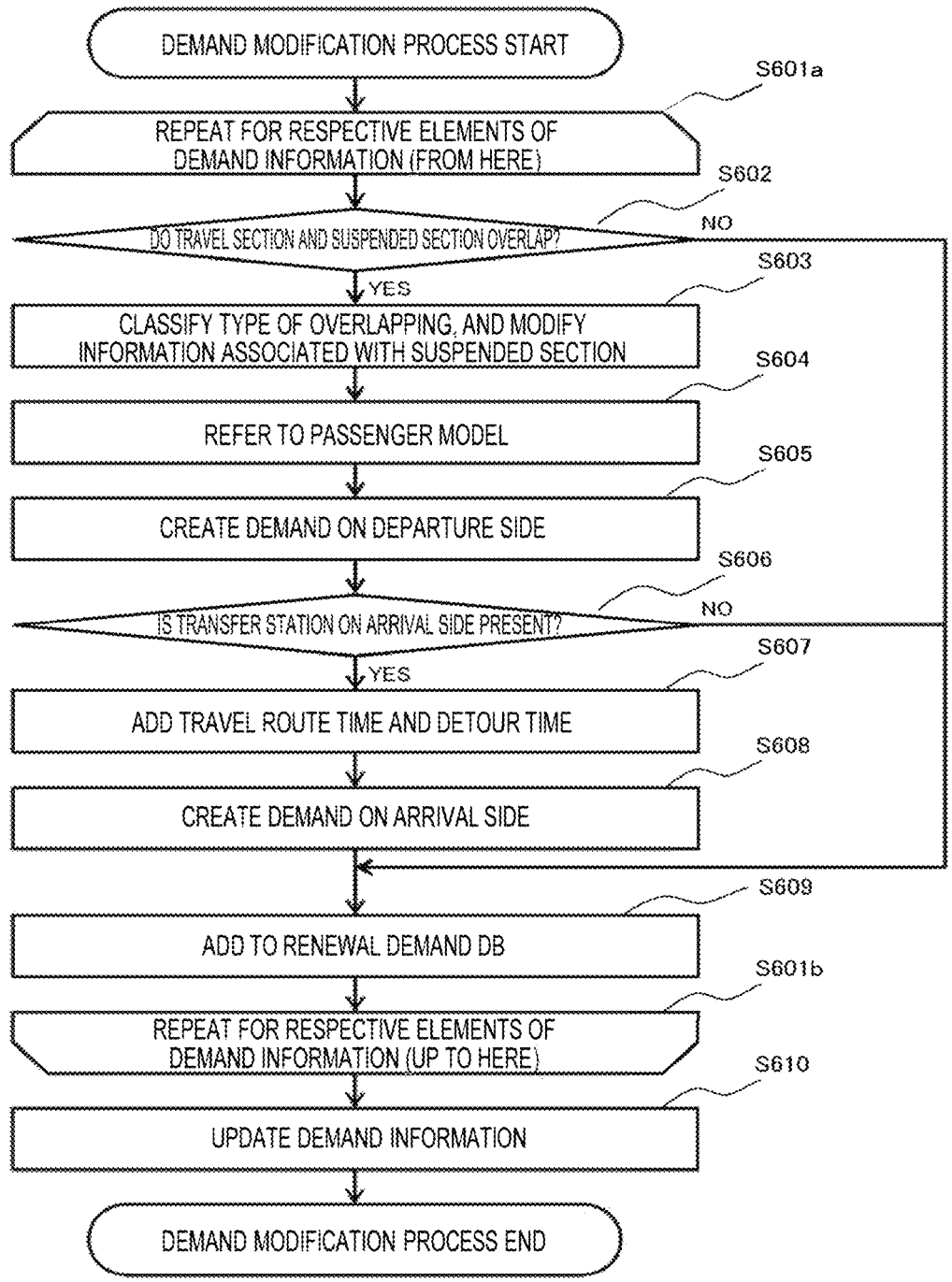
FIG. 18 is a flowchart illustrating details of a demand modification process according to the second embodiment.

FIG. 18 is a flowchart for explaining details of the demand modification process performed in step S205 illustrated in FIG. 12. As described below, when modifying demand information (e.g., demand data D90), a timetable rescheduling unit (e.g., timetable rescheduling program P01) uses a passenger model (e.g., type of passenger model "Type A") associated with information indicating respective passengers and contained in the demand information. In this case, demands can individually be modified according to characteristics or situations of respective passengers. Accordingly, demands suited for actual demands of respective passengers can be calculated.

Step S601a is processing performed by the CPU 101 of the train operation support system 100 depicted in FIG. 1, to repeat processing from step S602 to step S609 the number of times corresponding to the number of elements contained in demand information (duplication of information in the demand data D30). Step S601a sequentially selects the respective elements contained in the demand information in a course of repetitive processing (the selected element of the demand information will hereinafter be referred to as a "target demand"). The repetitive processing associated with step S601a is completed when reaching step S601b.

Step S602 is processing performed by the CPU 101 of the train operation support system 100 depicted in FIG. 1, to examine whether or not a travel section determined by a target demand overlaps with a suspended section determined by a planned timetable. In a case where the travel section and the suspended section overlap with each other (step 602; Yes), the flow proceeds to step S603. In a case where the travel section and the suspended section do not overlap with each other (step 602; No), the flow proceeds to step S609. In addition, in a case where a plurality of suspended sections are present, step S602 may determine overlapping by defining a new suspended section containing the plurality of suspended sections according to a positional relation between the travel section and the suspended sections, or may determine overlapping by selecting one of the suspended sections associated with the travel section, for example.

Step S603 is processing performed by the CPU 101 of the train operation support system 100 depicted in FIG. 1, to classify a type of overlapping and modify information associated with the suspended section. For example, step S603 classifies the overlap into types (1) where the travel section contains the suspended section, (2) where the suspended section contains a departure spot of the travel section but does not contain an arrival spot, (3) where the suspended section contains the arrival spot of the travel section but does not contain the departure spot, and (4) where the suspended section contains the travel section, and modify information associated with the suspended section according to the classified type. For modification of information associated with the suspended section here, a departure station may be set as "start point of suspended section" in a situation where "start point of suspended section" is located in a direction opposite to a direction toward an arrival station in a relative relation from the departure station, for example. Note that the types of overlapping are not limited to the types described above, and may be set according to the number of stations, a distance, or other factors overlapping between the travel section and the suspended section.

Step S604 is processing performed by the CPU 101 of the train operation support system 100 depicted in FIG. 1, to refer to the passenger model D60. For example, step S604 refers to the corresponding passenger model D60 in reference to data regarding "passenger behavior" defined for the target demand. Further, for example, step S604 extracts behavior information which has "waiting time" agreeing with, or closest to a waiting time of passengers corresponding to the target demand in modification candidates of the planned timetable among pieces of behavior information which indicate agreement between conditions of "start point of suspended section" and "end point of suspended section" in the referenced passenger model D60 and a suspended section in the modification candidates of the planned timetable.

Step S605 is processing performed by the CPU 101 of the train operation support system 100 depicted in FIG. 1, to create a demand on the departure side. For example, step S605 creates a demand for traveling from the departure station to a first transfer station according to a pair of stations set in "transfer station" in the behavior information extracted in step S604 (the demand for traveling from the departure station to the first transfer station is not created in a case where "*" is set for the first transfer station). At this time, "departure time" of the demand to be created is set using "departure time" of the referenced demand, for example, and "travel route" of the demand to be created is set using "departure station" of the referenced demand and "transfer station" determined in reference to the behavior information, for example.

Step S606 is processing performed by the CPU 101 of the train operation support system 100 depicted in FIG. 1, to examine presence or absence of a transfer station on the arrival side. In a case where a transfer station is present on the arrival side (step 606; Yes), the flow proceeds to step S607. In a case where a transfer station is absent on the arrival side (in a case where "*" is set for a second transfer station) (step 606; No), the flow proceeds to step S609.

Step S607 is processing performed by the CPU 101 of the train operation support system 100 depicted in FIG. 1, to add a travel route time and a detour time to a departure time in the referenced demand. For example, step S607 adds "travel route time," which is a length of time required for traveling from the departure station to the arrival station in the demand on the departure side by train, and "detour time" of the passenger behavior extracted in step S604 to the "departure time" in the referenced demand.

Step S608 is processing performed by the CPU 101 of the train operation support system 100 depicted in FIG. 1, to create a demand on the arrival side. For example, step S608 creates a demand for traveling from the second transfer station to the arrival station according to a pair of stations set in "transfer station" in the behavior information extracted in step S604. At this time, "departure time" of the demand to be created is set using the time calculated in step S607, for example, and "travel route" of the demand to be created is set using "arrival station" of the referenced demand and "transfer station" determined in reference to the behavior information, for example.

Step S609 is processing performed by the CPU 101 of the train operation support system 100 depicted in FIG. 1 to add the created demands to a renewal demand database (DB). For example, step S609 adds the demands created in steps S605 and S608 to the renewal demand database (DB).

Step S601b is processing performed by the CPU 101 of the train operation support system 100 depicted in FIG. 1, to return to step S601a.

Step S610 is processing performed by the CPU 101 of the train operation support system 100 depicted in FIG. 1, to update demand information. For example, step S610 updates the demand information by duplicating demands stored in the renewal demand database (DB).

In addition, in a case where transfer from a station within a target railway line to the outside of the target railway line occurs a plurality of times, for example, the demand modification process may repeat processing from step S605 to step S608 and thereby sequentially process a plurality of pairs of transfer stations defined in the passenger model D60, to modify demands. For example, in a case where two pairs of transfer stations are defined, a demand for traveling from a departure station to a first transfer station (a first element of a first pair of transfer stations), a demand for traveling from a second transfer station (a second element of the first pair of transfer stations) to a third transfer station (a first element of a second pair of transfer stations), and a demand for traveling from a fourth transfer station (a second element of the second pair of transfer stations) to an arrival station are created.

According to the configuration of the second embodiment, as described above, the types of the passenger model D60 are allocated to respective passengers in the demand data D30 beforehand. In this configuration, demands can individually be modified according to characteristics or situations of respective passengers. Accordingly, a staying amount of passengers can be estimated using demands suited for actual demands of respective passengers. For example, modification of demands of target passengers and estimation of a staying amount are achievable by modifying information associated with a suspended section according to a departure station and an arrival station of each passenger. In addition, in a case where the passenger model D60 is created or adjusted using GPS data of portable terminals carried by respective passengers, data obtained from a travel route search application, or the like, the passenger model D60 suited for demands of passengers can be established by linkage with the demand measurement system 300.

DESCRIPTION OF REFERENCE SYMBOLS

100: Train operation support system
101: CPU
102: Memory
103: Input device
104: Transmission/reception unit
105: Storage unit
106: Communication unit
200: Traffic management system
300: Communication network

The invention claimed is:

1. A train operation support system for outputting a rescheduled timetable for a planned timetable of a train from a computer by using the planned timetable and an actual timetable of the train, the train operation support system comprising:
   a timetable modification unit that modifies the planned timetable by using a given timetable modification method;
   a passenger flow prediction unit that calculates passenger staying information containing information indicating a number of staying passengers in each time zone at each station, by using demand information indicating a destination of a passenger in each time zone at each station where the train stops;
   a timetable rescheduling unit that modifies the demand information in reference to the planned timetable modified by the timetable modification unit, inputs the modified demand information to the passenger flow prediction unit, and creates the rescheduled timetable for the planned timetable by using the passenger staying information output from the passenger flow prediction unit;
   an output unit that outputs the rescheduled timetable created by the timetable rescheduling unit; and
   a display screen that displays the output of the rescheduled timetable including line segments representing running of trains among the each station, each of the line segments indicating running of the trains being colored according to a number of riding passengers of a corresponding train, and a horizontal axis, representing a position of the each station, being colored according to the number of staying passengers in the each time zone at the each station.

2. The train operation support system according to claim 1, further comprising:
   a storage unit that stores a statistic containing information indicating a ratio associated with a behavior selected by the passenger for traffic conditions of the train, wherein
   the timetable rescheduling unit modifies the demand information by using the planned timetable modified by the timetable modification unit and the statistic.

3. The train operation support system according to claim 1, further comprising:
   a storage unit that stores a passenger model indicating a travel route of the passenger for traffic conditions of the train, wherein
   the timetable rescheduling unit modifies the demand information by using the planned timetable modified by the timetable modification unit and the passenger model.

4. The train operation support system according to claim 3, wherein the timetable rescheduling unit uses information associated with a suspended section as traffic conditions defined in the passenger model, at the time of modification of the demand information.

5. The train operation support system according to claim 3, wherein the timetable rescheduling unit uses a passenger model associated with information indicating each passenger and contained in the demand information, at the time of modification of the demand information.

6. The train operation support system according to claim 1, wherein the timetable rescheduling unit estimates, by using the passenger staying information output from the passenger flow prediction unit, a staying amount containing either one of or both the number of staying passengers indicating the number of passengers staying in each time zone at each station and density indicating a level of congestion of passengers staying in each time zone at each station, for the planned timetable modified by the timetable modification unit, calculates an evaluation value associated with the staying amount, and creates the rescheduled timetable for the planned timetable by using the evaluation value.

7. The train operation support system according to claim 6, wherein the timetable rescheduling unit calculates the evaluation value associated with the staying amount by using a weighted value set for each station, or calculates the evaluation value associated with the staying amount by using either one of or both the staying amount larger than a predetermined threshold and the staying amount smaller than the predetermined threshold.

8. The train operation support system according to claim 6, further comprising:
   a storage unit that stores at least one of passenger flow information containing information indicating the staying amount for the rescheduled timetable and timetable modification log information containing information indicating modification practiced at the time of creation of the rescheduled timetable, wherein
   the at least one of the passenger flow information and the timetable modification log information is output together with the rescheduled timetable.

9. The train operation support system according to claim 1, wherein
   the passenger flow prediction unit further calculates passenger riding information containing information indicating the number of riding passengers at the time of departure of each train from each station, and
   the timetable rescheduling unit creates the rescheduled timetable for the planned timetable by using the passenger staying information and the passenger riding information output from the passenger flow prediction unit.

10. A train operation support method performed by a computer to output a rescheduled timetable for a planned timetable of a train by using the planned timetable and an actual timetable of the train, the train operation support method comprising:
   a process of modifying, by a train operation support system, the planned timetable in reference to a given timetable modification method;
   a process of modifying, in reference to the modified planned timetable, demand information indicating a destination of a passenger in each time zone at each station where the train stops;
   a process of calculating passenger staying information containing information indicating a number of staying passengers in each time zone at each station by using the modified demand information;
   a process of creating a rescheduled timetable for the planned timetable by using the calculated passenger staying information;
   a process of outputting the created rescheduled timetable; and
   a process of displaying the output of the created rescheduled timetable including line segments representing running of trains among the each station, each of the line segments indicating running of the trains being colored according to a number of riding passengers of a corresponding train, and a horizontal axis, representing a position of the each station, being colored according to the number of staying passengers in the each time zone at the each station.

* * * * *